United States Patent
Lee et al.

(10) Patent No.: US 7,031,279 B2
(45) Date of Patent: Apr. 18, 2006

(54) GATEKEEPER SUPPORTING HANDOFF AND HANDOFF METHOD IN IP TELEPHONY SYSTEM

(75) Inventors: Young-Sin Lee, Seoul (KR); Gi-Moo Choi, Kyungki-Do (KR); Hwan-Jong Kang, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 912 days.

(21) Appl. No.: 09/987,037

(22) Filed: Nov. 13, 2001

(65) Prior Publication Data
US 2002/0085517 A1    Jul. 4, 2002

(30) Foreign Application Priority Data
Dec. 30, 2000   (KR) ............................. 2000-87332
Jun. 28, 2001   (KR) ............................. 2001-37560

(51) Int. Cl.
*H04Q 7/00* (2006.01)
(52) U.S. Cl. .................. 370/331; 370/401; 370/260; 455/436
(58) Field of Classification Search ............. None
See application file for complete search history.

(56) References Cited

U.S. PATENT DOCUMENTS

| | | | |
|---|---|---|---|
| 6,373,839 B1 * | 4/2002 | Clark et al. ............. | 370/352 |
| 6,731,609 B1 * | 5/2004 | Hirni et al. ............. | 370/260 |
| 6,801,521 B1 * | 10/2004 | Shaffer et al. ........... | 370/352 |
| 6,885,658 B1 * | 4/2005 | Ress et al. .............. | 370/352 |

* cited by examiner

*Primary Examiner*—Chi Pham
*Assistant Examiner*—Thai Hoang
(74) *Attorney, Agent, or Firm*—Fleshner & Kim, LLP

(57) ABSTRACT

A gatekeeper supporting a handoff and handoff method in an IP telephony system is disclosed. The gatekeeper is configured to perform third-party pause and rerouting (3PPR) signaling and to support the handoff using 3PPR signaling, so that a mobile terminal does not need to have a H.450.2 stack function. In addition, for a fast connect call, the H.245 control channel is induced and the 3PPR signaling, which is made through the H.245 control channel, is performed for every call including the fast connect call. Thus the handoff using the 3PPR signaling can be provided to every call. Moreover, the H.245 control channel for the fast connect call is set on the basis of the tunneling during a telephony, so that the fast connection can be maintained as it is and, thus, the fast handoff signaling can be provided.

27 Claims, 13 Drawing Sheets

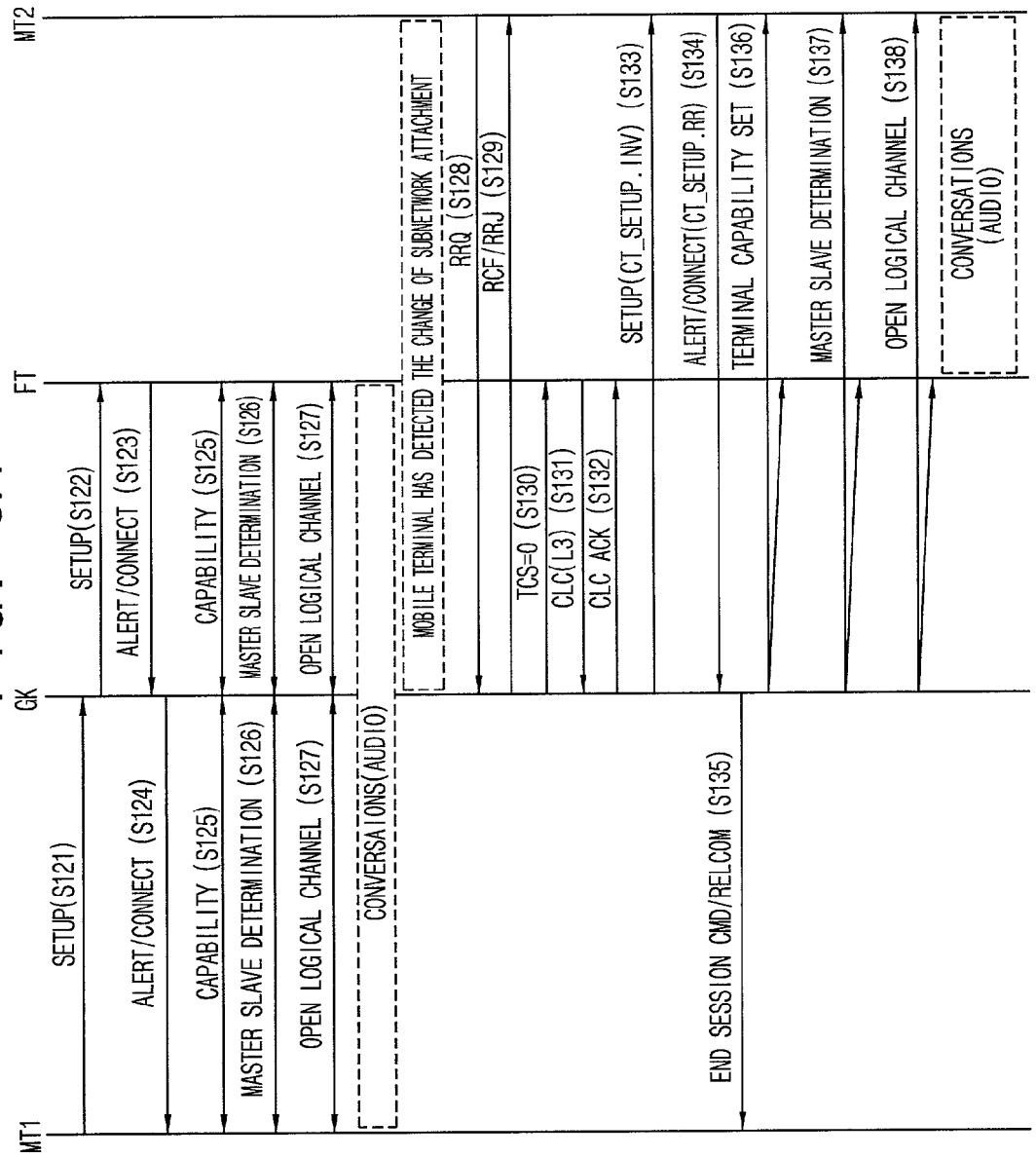

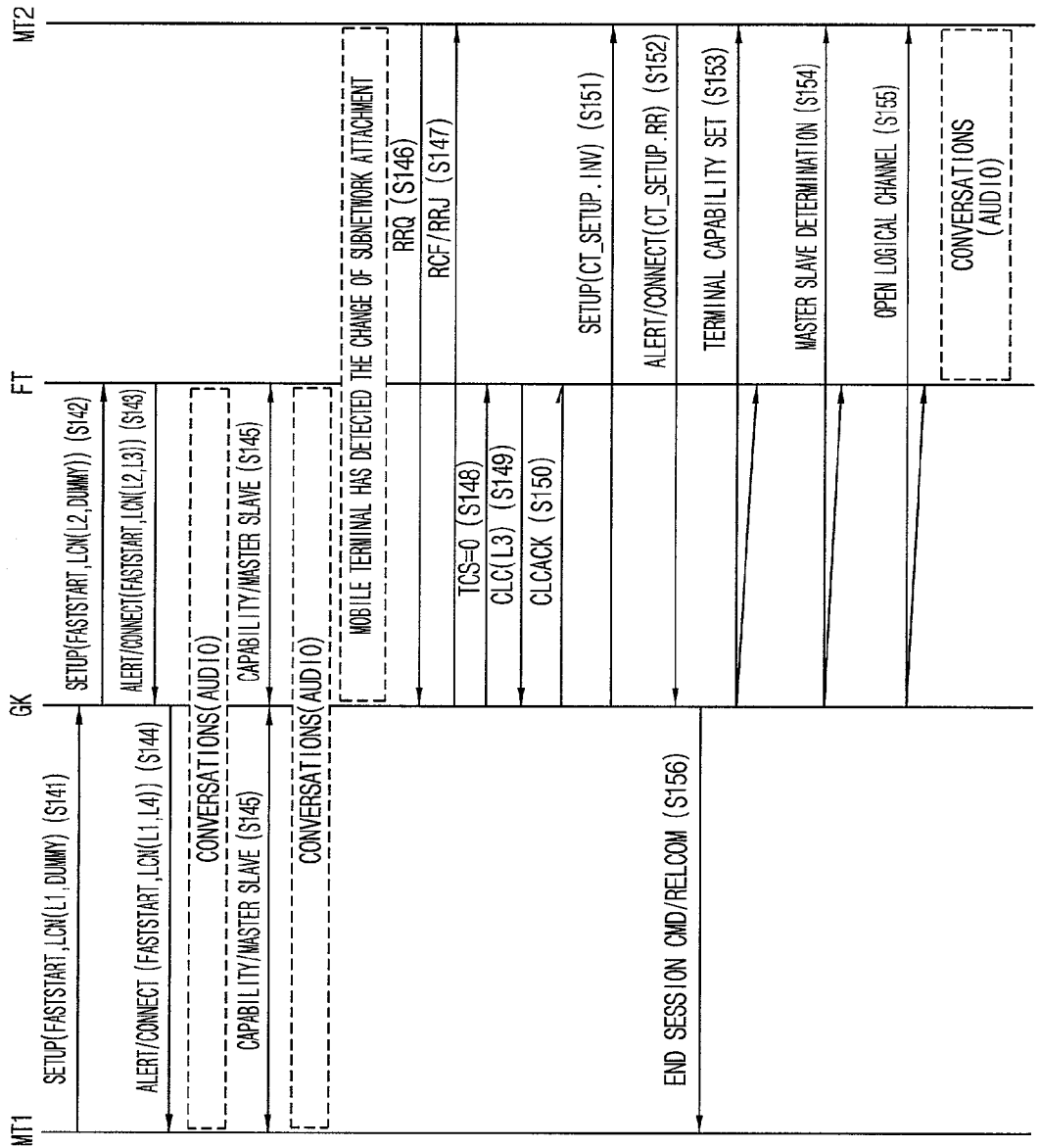

GATEKEEPER SUPPORTING HANDOFF AND HANDOFF METHOD IN IP TELEPHONY SYSTEM

BACKGROUND OF THE INVENTION

1. Field of the Invention

The present invention relates to an Internet protocol (IP) telephony system and, more particularly, to a gatekeeper supporting a handoff and handoff method in an IP telephony system.

2. Background of the Related Art

With an increase in the demand of terminals in the LAN environment, mobility support for an IP terminal is expected to heighten productivity of IP telephony.

Currently, two institutions standardize an IP telephony protocol. These are an International Telecommunication Union (ITU), which has adopted H.323 as a standard, and an Internet Engineering Task Force (IETF), which has adopted Session Initiation Protocol (SIP) as a standard. The H.323 standard has been widely implemented as a product, defining a system component and a control message or the like for a multimedia communication in a packet-based network.

In order to support mobility of a terminal, an Annex H of H.323 has been proposed as a draft. H.323 Annex H proposes to support a handoff using a mobile IP and H.323 ad hoc conference signaling. H.323 ad hoc conference signaling necessarily requires a multipoint controller (MC). The MC performs a control function and terminals attending the ad hoc conference are to react suitably to various command messages transmitted through a H.245 control channel When a gatekeeper receives an ad hoc expansion signaling request, it is operated in an MC mode. The gatekeeper transmits a message informing the conferencing terminals that a corresponding call is extended to an ad hoc conference mode and then the terminals respond to the message transmitted from the MC, thereby performing the ad hoc conference signaling.

A conventional handoff method using the ad hoc conference signaling proposed by H.323 Annex H will next be described. H.323 Annex H is a draft for supporting mobility of the terminal and defining a home gatekeeper and a foreign gatekeeper as concepts equivalent to a public land mobile network (PLMN) and a home location register (HLR). A home zone is managed by the home gatekeeper, and is where a mobile terminal remains most of the time without movement. A foreign zone is managed by the foreign gatekeeper, to where the mobile terminal is movable. Movement of the mobile terminal between subnets in a zone is called an intra-zone roaming and movement of the mobile terminal between zones is called an inter-zone roaming.

H.323 Annex H views a handoff in a concept that the mobile terminal dynamically participates in the ad hoc conference, regardless of the intra-zone roaming and the inter-zone roaming.

FIG. 1 is a flow chart of a related art handoff using the ad hoc conference signaling proposed by H.323 Annex H. A mobile H.323 terminal (MT1) provides an IP telephony service to a subscriber according to the H.323 protocol. A fixed H.323 terminal (FT) provides the IP telephony service to the subscriber according to a H.323 terminal. The gatekeeper (GK) performs a function of registering and managing information of the H.323 service subscriber, a function of call admission and authorization, an address conversion function, and a zone management function. For the purpose of describing FIG. 1, it is assumed that MT1 is an origination terminal, FT is a destination terminal, MT1 and FT are in a connected state, and the MT1 terminal is re-designated as an MT2 terminal after moving to a different subnet.

As shown in FIG. 1, when a terminal MT1/MT2 roams to another subnet, it discovers that its own network connection point has been changed through a mobile IP, a gatekeeper request (GRQ), and a mobility gatekeeper advertisement (MGA) message (step S11). MT2 obtains a care of address (COA), which is a new IP address, and is admitted for registration to the gatekeeper with the obtained IP address as its own IP (steps S12~S15). After the terminal is registered, the terminal transmits a set-up (goal=JOIN) message to the call with which it was related before roaming (step S16). This message induces an ad hoc conference signaling so that a media channel is rerouted to the terminal to thereby support a handoff.

The H.323 ad hoc conference signaling needs the MC, which controls the conference signaling, and the terminals attending the ad hoc conference are to react properly to the MC Location Indication, Terminal Number Assign, Communication Mode Command messages transmitted from the MC of the GK.

Upon receipt of the set-up (goal=JOIN) message from MT2, the gatekeeper performs a mode switch for related call information from a peer-to-peer call to the multipoint call. While performing the mode switch, the gatekeeper performs the MC function.

The gatekeeper does not transmit the SETUP message received from MT2, in the MC mode, to FT or MT1. However, the gatekeeper transmits a CONNECT message directly to MT2 (steps S17, S18). Upon receipt of the CONNECT message, MT2 and the gatekeeper perform a control channel set signaling and up to a master slave determination signaling. Until then, corresponding H.245 messages are transmitted and received only between the gatekeeper and MT2.

When the master slave determination is performed, the gatekeeper sends an MC Location Indication message to inform the terminals attending the ad hoc conference that the corresponding call has been changed to the multi-point call (step S19). Additionally, the GK sends the terminals a terminal number assignment message (step S20). In addition, to inform the conference participants that the ad hoc conference has been selected as a common mode, the gatekeeper transmits a Communication Mode Command message to the terminals attending the ad hoc conference (step S21).

If a currently opened real-time transport protocol (RTP) mode is different from the mode of the Communication Mode Command message, the terminals which receive the corresponding message should have a function to transmit a logical channel setup message to the gatekeeper and transmit a logical channel release message to the gatekeeper (step S22).

An environment in which the gatekeeper supports only the MC and does not support the multipoint processor (NP), which mixes several media streams, brings about more complicated signaling. That is, every terminal attending the ad hoc conference should multicast its own audio data and mix every audio stream coming to itself. Accordingly, the terminal performs the logic channel set-up message several times.

In addition, as shown in FIG. 1, since MT1 does not exist at the present time, FT and MT2 are to process the logic channel set-up message in consideration of MT1. A handoff signal using the ad hoc conference signaling is to be performed differently to the general ad hoc conference signaling. Thus, in a case where a handoff is supported through the ad hoc conference signaling, the terminal is to process so many works and a long signaling time is taken due to many message exchanges.

On the other hand, the H.323 ad hoc conference signaling used for the handoff can be replaced with call transfer signaling. The call transfer is a function of turning a call for someone to a different user, which, thus, can be used for a handoff signaling that turns a call to a different area where a mobile terminal has been moved.

In H.323, the call transfer function is implemented through H.450.1, H.450.2. Numerous options and error conditions require this protocol for a supplementary service, which can be implemented in a H.323 terminal and a gatekeeper.

H.323 is disadvantageous in that its call set-up time is longer than that of the SIP, because, despite a H.323 peer-to-peer call, it is performed through five steps of an admission Request/Admission confirm (ARQ/ACF) round trip, a SETUP/CONNECT round trip, a H.245 capability set exchange round trip, a H.245 master slave determination round trip, and a logical channel setup round trip.

In addition, the Q.931 channel used for the SETUP/CONNECT round trip and the H.245 call control channel used for the H.245 incoming/outgoing capability exchange and H.245 master slave determination round trip are made on the basis of a transmission control protocol (TCP). Q.931 is a call signal protocol and H.245 is a control protocol for multimedia communication. The TCP connection needs an additional delay for synchronization of a TCP window sequence number, which may take hundreds of milliseconds (ms) in a wide area network (WAN) environment.

In order to make up for the shortcomings, H.323 v uses fast connect and tunneling. Fast connect finishes a call set-up with a SETUP/CONNECT procedure. Tunneling causes the H.245 call control channel and the Q.931 channel to use the same TCP connection, so as to provide a prompt call set-up time.

However, a call made by the fast connect is not obliged to open the H.245 control, according to the ITU the recommendation. Thus, the existing gatekeeper does not open the H.245 control channel when a call is established by the fast connect. Thus, a third party initiated pause and rerouting function using the H.245 control channel is not provided, so that H.450.2 should be implemented in both the gatekeeper and the terminal for the service using the call transfer. H.450.2 is a H.323 supplementary service protocol.

The related art handoff method using the call transfer will now be described.

FIG. 2 is a flow chart of a handoff signaling method using a call transfer in case of a call without a control channel for a multimedia communication, that is, without a H.245 control channel. A call has been connected between MT1 and FT. MT2 is the new designation for terminal MT1 after MT1 has moved to another subnet. FT and MT1 set up a call by the fast connect and transmit and receive data (steps S31, S32). Thereafter, when MT1 is re-designated as MT2 and MT2 requests a registration from the gatekeeper, the gatekeeper admits a registration of MT2 (steps S33, S34).

Since there is no control channel for a multimedia communication in the corresponding call, the gatekeeper, which has admitted registration of MT2, carries a CT_INIT.INVOKE Application Protocol Data Unit (APDU) informing FT that MT1 has been re-designated as MT2, on a FACILITY message, and transmits it to FT (step S35). Upon receipt of the FACILITY message, A(FT) analyzes the CT_INIT.INVOKE and transmits a SETUP message to the gatekeeper. At this time, FT carries a CT_SETUP.INVOKE APDU on the SETUP message to inform the gatekeeper that the corresponding call is to be performed as a call transfer.

Upon receipt of the SETUP message, the gatekeeper analyzes the CT_SETUP.INVOKE APDU of the SETUP message, records it in call set-up information, and transmits the SETUP message to MT2. When the gatekeeper transmits the SETUP message, it reproduces the CT_SETUP.INVOKE APDU using the information analyzed from the call set-up information and transmits it to MT2 (step S36).

Upon receipt of the SETUP message, MT2 carries a CT_SETUP.RRAPDU on a CONNECT message and transmits it to the gatekeeper. Then, the gatekeeper transmits the received CONNECT message to the A(FT), so that the call transfer is performed (step S37). Thereafter, the A(FT) sends a RELOCM message to B(MT1) (step S38).

In detail, in the call transfer structure as shown in FIG. 2, a supplementary service stack, that is, a H.450.2 stack, is requested to be wholly implemented in the terminal. The reason for this is that the gatekeeper generates, or the terminals which transmits the H.450 APDU generate, a timer for the corresponding APDU and processes the abnormal state when a result value is not received within a predetermined time.

Thus, the terminals should analyze every H.450.2 ADPU and record the control state of the corresponding message. In this respect, however, it is very difficult to implement the H.450.2 stack with every case considered, since an IP phone has a memory restriction.

In addition, the method where H.450 stack is implemented in both the gatekeeper and the H.323 terminal, to support a supplementary service in a distributed form, makes the signaling time long due to the increase of exchanged messages.

Thus, the handoff using the call transfer in a distributed form, not the gatekeeper leading form, increases a burden to the terminal like the H.323 ad hoc conference signaling, causing the problem that the handoff signaling time is lengthened.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a gatekeeper supporting a handoff in an IP telephony system.

Another object is to provide a gatekeeper that is capable of effectively supporting a handoff using a third party initiated pause and rerouting (3PPR) signaling, performed through a control channel of a multimedia communication for every call containing a fast connect call and handoff method.

Another object of the present invention is to provide a gatekeeper supporting a handoff in an IP telephony system in which a gatekeeper having a third party initiated pause and rerouting signaling function initiatively performs a handoff, thereby reducing a load to a terminal and providing a prompt handoff signaling when a media channel is re-set.

Still another object of the present invention is to provide a gatekeeper supporting a handoff in an IP telephony system in which a mobile terminal can be provided with a handoff service even without acquiring a new IP, by performing an intrazone handoff using a cellular IP for effectively routing packets heading for a moved terminal in an open system interconnection (OSI) network layer.

To achieve the above objects in whole or in part, there is provided a gatekeeper for supporting a handoff in an IP telephony system. The gatekeeper includes a RAS managing unit for processing a registration, admission, and status (RAS) message, interfacing with a network layer, and calling a conference managing unit while processing a COA registration for a handoff of a mobile terminal; a RAS message processor for encoding and decoding the RAS message; a call managing unit for processing a call signal message; a H.225 call signal processor for carrying the call signal message on a corresponding carrier and encoding and decoding the call signal message; a conference managing unit for processing a multimedia communication control message, performing a 3PPR signaling, and performing a handoff and a call transfer signaling; a H.245 control message processor for encoding and decoding the messages of the call managing unit and the conference managing unit in conformity of the PER; a supplementary service managing unit for calling the conference managing unit while processing a message for a supplementary service; a call set-up information node for recording information obtained when the call signal message is processed; a conference information node for recording control information obtained when the multimedia communication control message is processed; a supplementary service information node for recording information obtained when the message for the supplementary service is processed; and a user information buffer for recording user information managed by the RAS managing unit.

To achieve at least these advantages in whole or in part, there is further provided an intra-zone handoff method in an IP telephony system including checking by a gatekeeper whether a general call is established or a fast connect call is established when a call is established between an origination terminal and a destination terminal; opening a H.245 control channel with the origination terminal and the destination terminal when the fast connect call is established; instructing to suspend the destination terminal to perform a handoff when a registration is requested by the origination terminal, which has moved to a different subnet of the same zone using a newly allocated COA; performing a Q.931 signaling with the moved origination terminal and transmitting a terminal capability set message received from the moved origination terminal to the destination terminal in a suspended state to re-initiate the destination terminal; and performing a master slave determination signaling and a logic channel establishment signaling along with the moved origination terminal and the destination terminal and rerouting the RTP packet received from the destination terminal to the moved origination terminal to complete the intra-zone handoff procedure.

To achieve at least these advantages in whole or in part, there is further provided an intra-zone handoff method in an IP telephony system including updating routing information of a first routing cache, when a packet is received from a mobile terminal which visits a new subnet, and transmitting the packet from a cellular IP base station to a cellular IP router; updating routing information of a second routing cache when the packet is received from the cellular IP base station and routing the received packet from the cellular IP router to the cellular IP gateway; and updating routing information of a third routing cache when the packet is received from the cellular IP router and routing the received packet to the other party terminal according to the routing information stored in the third routing cache, thereby supporting an intra-zone handoff.

To achieve at least these advantages in whole or in part, there is further provided an inter-zone handoff method in an IP telephony system including checking whether a general call is established or a fast connect call is established when a call is established between an origination terminal and a destination terminal; opening a H.245 control channel between the origination terminal and the destination terminal when the fast connect call is established; informing a home gatekeeper (HGK) of inter-zone roaming of the origination terminal by a foreign gatekeeper (FGK), when the origination terminal moved into a subnet of a different zone requests a registration from the FGK using a newly allocated COA; admitting the registration of the moved origination terminal and instructing to suspend the destination terminal, when the inter-zone roaming of the origination terminal is sensed by the HGK; performing a direct signaling between the moved origination terminal and the FGK, when a set-up message is transmitted to the moved origination terminal, and opening a Q.931 channel directly by the moved origination terminal and the HGK without passing the FGK; receiving a terminal capability set message from the moved origination terminal and transmitting the received terminal capability set message to the destination terminal to re-initiate the destination terminal; performing a H.245 control signaling together with the moved origination terminal and the destination terminal and rerouting an RTP packet received from the destination terminal to the moved origination terminal, thereby completing the inter-zone handoff procedure.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

The invention will be described in detail with reference to the following drawings in which like reference numerals refer to like elements wherein:

FIG. 6A illustrates a flow chart of an intra-zone handoff method using a 3PPR signaling in case of a general H.323 call, in accordance with a preferred embodiment of the present invention;

FIG. 6B illustrates a flow chart of an intra-zone handoff method using the 3PPR signaling in case of a fast connect call;

DETAILED DESCRIPTION OF PREFERRED EMBODIMENTS

H.323 is a packet-based multimedia protocol. H.323 is a dynamic protocol that can convert its own logic channel information of a call using a control channel, that is, a H.245 control channel, for a multimedia communication.

A gatekeeper may change real-time transmission protocol (RTP) session information of a terminal to support a call transfer using a basic H.245 message. For example, after the gatekeeper closes an incoming channel of the terminal using a Close Logical Channel message, it may send an Open Logical Channel message to the terminal and change a source of a received RTP stream.

After the gatekeeper transmits an Empty Capability Set message to the terminal using Third Party Pause and Re-routing (3PPR) signaling to close the outgoing channel of the terminal, it may transmit a different Capability Set message to the terminal so that the terminal can transmit the RTP data with the changed coder/decoder (CODEC) and the changed address.

When the 3PPR is implemented in the gatekeeper, the gatekeeper is operated instead of the terminal for a H.450.x APDU, so that the terminal without the H.450.x can be provided with a supplementary service (H.450.x is a H.323 supplementary service protocol).

However, the terminals of above H.323v2 use a fast connect signaling. The fast connect signaling enables a communication only by the SETUP/CONNECT round trip, without setting a H.245 control channel, thereby shortening the H.323 call set-up time.

Accordingly, the gatekeeper should support the structure for inducing a control channel, for a multimedia communication, even for the call established as the fast connect.

Figure 1:
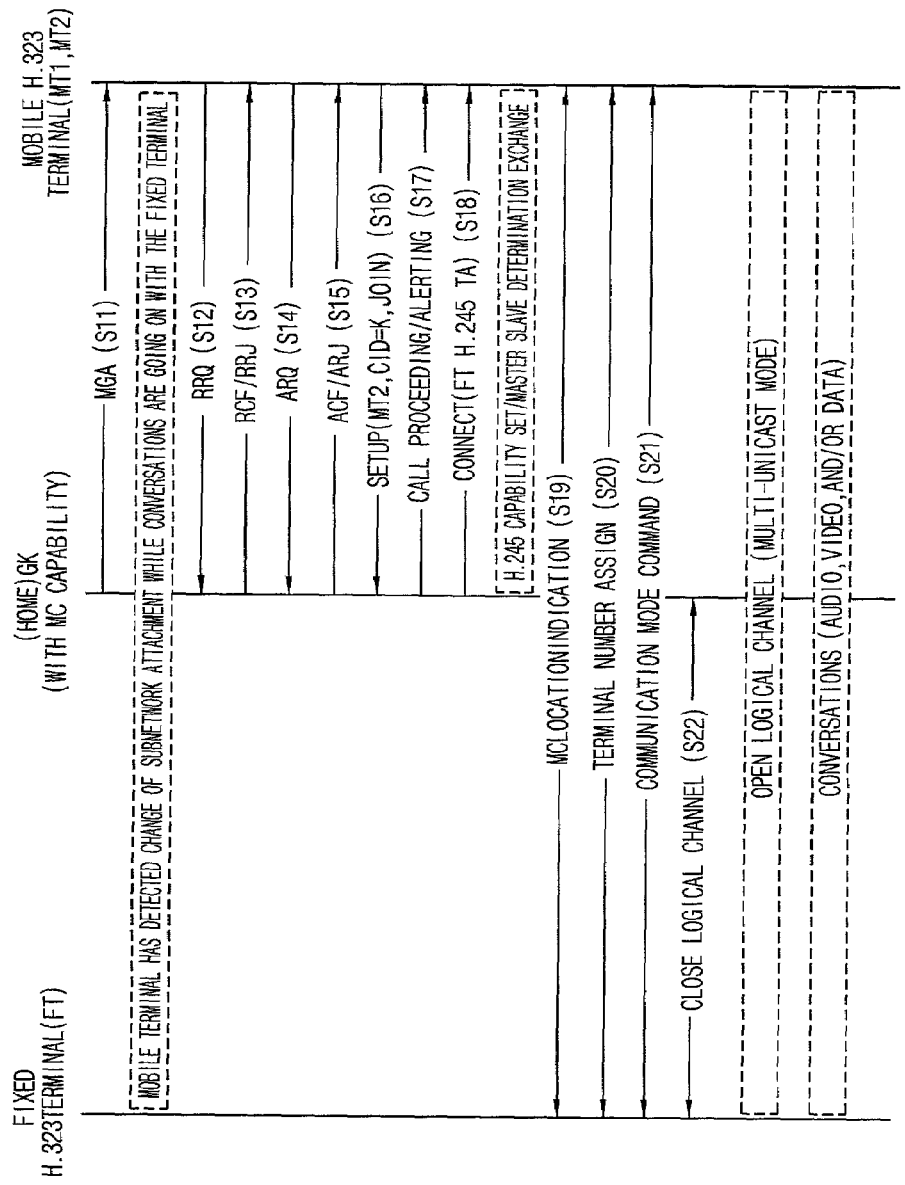
FIG. 1 illustrates a flow chart of a handoff method using an ad hoc conference signaling proposed in H.323 Annex H, in accordance with the background art.
Figure 2:
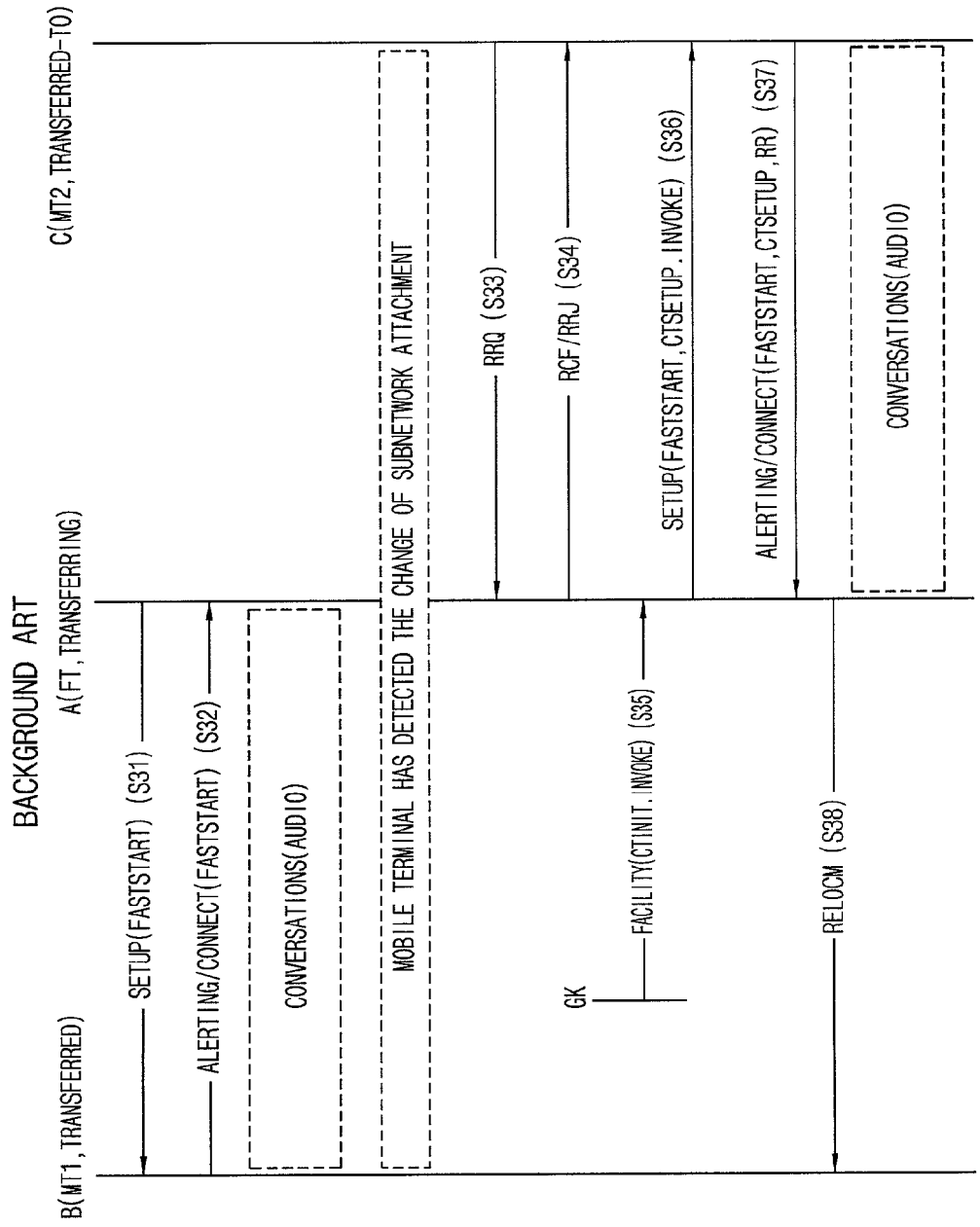
FIG. 2 illustrates a flow chart of a handoff signaling method using a call transfer in case of a call without a H.245 control channel, in accordance with the background art.
Figure 3:
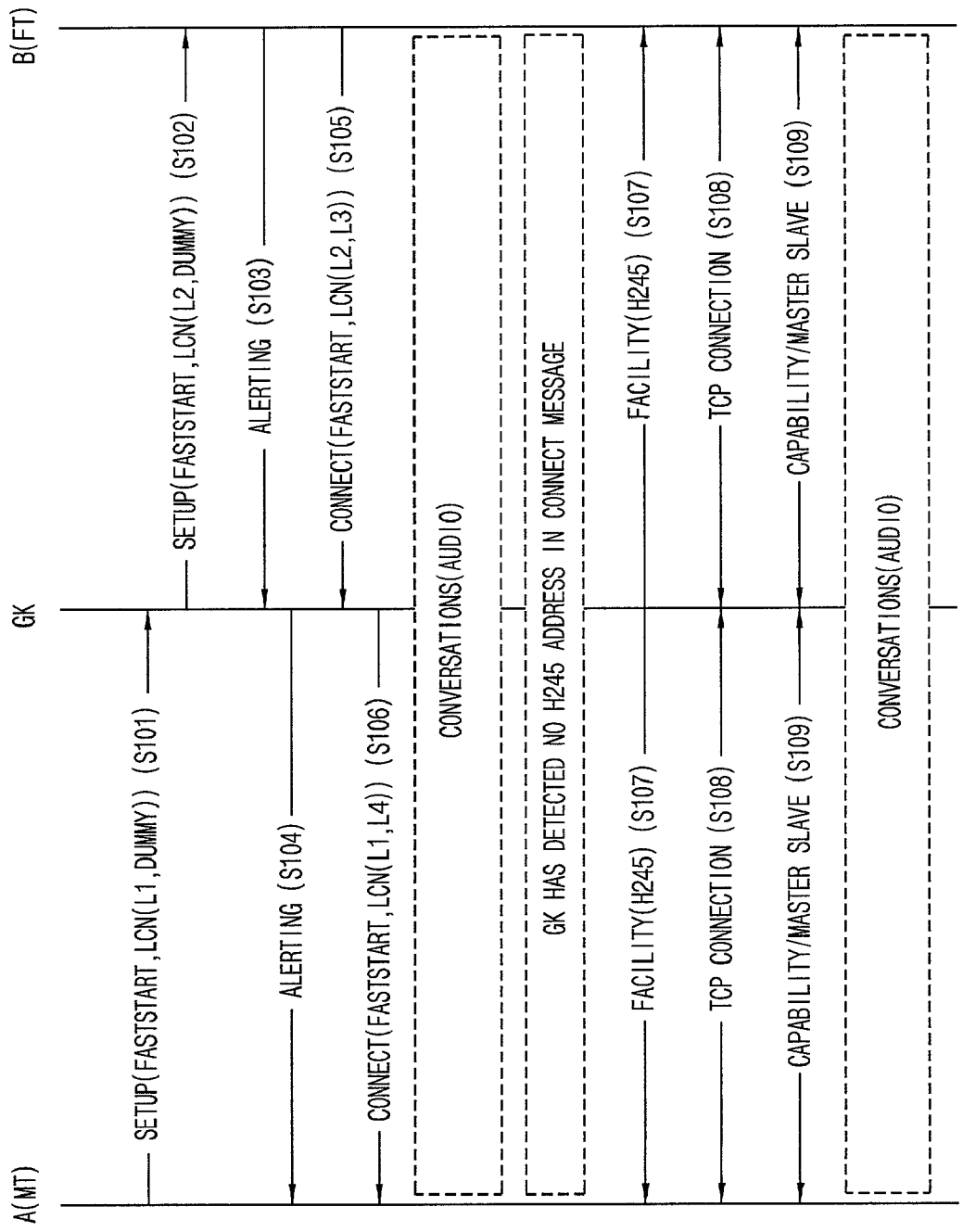
FIG. 3 illustrates a flow chart of a method for inducing H.245 control channel for a fast connect call in accordance with a preferred embodiment of the present invention.

FIG. 3 is a flow chart of a method for inducing a H.245 control channel for a fast connect call in accordance with a preferred embodiment of the present invention. The MT is a mobile terminal providing an IP telephony service to a subscriber, according to a H.323 protocol. An FT (Fixed H.323 terminal) is a fixed terminal providing an IP telephony service to a subscriber according to H.323 protocol.

The gatekeeper performs a function of registration and management of information for a H.323 service subscriber, a call admission/authorization function, an address conversion function, and a zone management function. If an established call does not have the H.245 control channel, the gatekeeper preferably induces the establishment of the H.245 control channel. A call is established by a fast connect signaling between the MT and FT.

As shown in FIG. 3, the gatekeeper determines whether the Q.931 response message transmitted from the B (FT) contains a H.245 address to induce a control channel between the A(MT) and a B (FT), while performing the fast connect signaling (steps S101~S106). If there is no H.245 address when the gatekeeper receives a CONNECT message, the gatekeeper causes the A (MT) and the B (FT) to set up a H.245 TCP connection using a FACILITY message and opens the control channel by H.245 signaling with the terminals (steps S107~S109). Steps S107~S109 are performed in a state that the fast connect call between A (MT) and B (FT) is set and busy.

When the H.245 control channel is opened, the gatekeeper supports a function of buffering a message. Thus, for example, when the gatekeeper transmits the SETUP message to B (FT) by tunneling, the tunneling value is 'TRUE' regardless of a value transmitted from A (MT). If B (FT) supports tunneling, the gatekeeper maintains an asymmetrical TCP connection such that the gatekeeper is TCP-connected to B (FT) but not TCP-connected to A (MT). In such a case, the gatekeeper performs H.245 signaling with a terminal that is TCP-connected, while attempting a TCP-connection to the terminal which has not performed tunneling. Since the gatekeeper is not able to transmit the H.245 message to the terminal that has not been TCP connected, it buffers the received H.245 message. The buffered messages are transmitted at one time when the TCP connection is later made and the related H.245 control state is transitioned according to the TCP connection state.

The opened H.245 control channel information is maintained as it is, as the information in a FastStart field. As shown in FIG. 3, A (MT) attempts a fast connect to B (FT) using the FastStart field (step S101). In the gatekeeper route signaling, the gatekeeper becomes a callee of A (MT) and a caller of B (FT) and executes the signaling by maintaining mutually independent signaling information between A (MT) and B (FT). That is, the gatekeeper maintains 'LCN=L1' as an incoming logic channel and 'LCN=L4' as an outgoing logic channel, with respect to A (MT), and maintains 'LCN=L2' and 'LCN=L3' with respect to B (FT). The terminal performs a signaling for receiving the RTP data through the incoming channel and performs a signaling for transmitting the RTP data by the outgoing channel.

Figure 4:
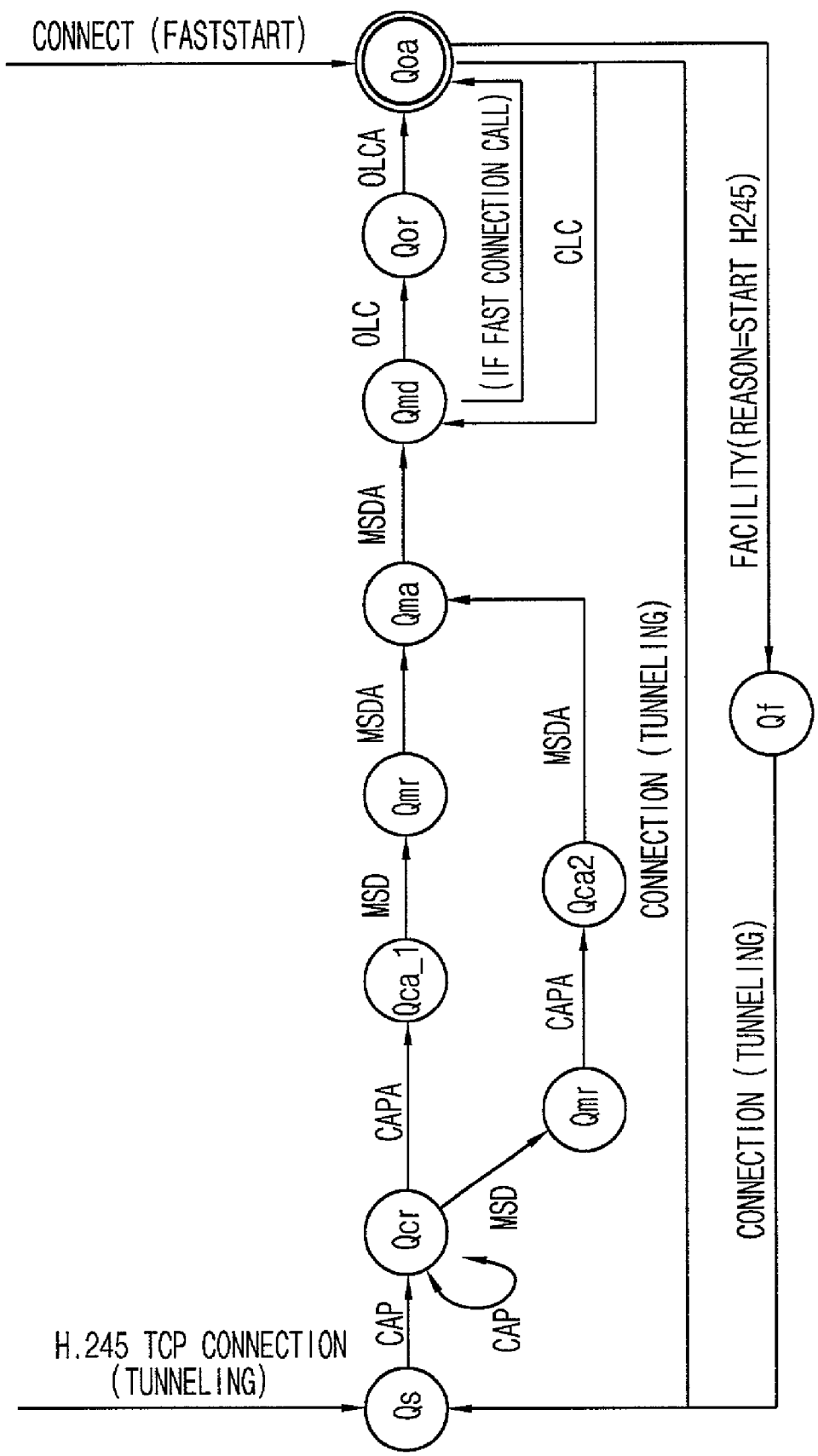
FIG. 4 illustrates a state transition diagram of H.245 signaling in accordance with a preferred embodiment of the present invention.

FIG. 4 is a view illustrating a state transitionion diagram of the H.245 signaling, which is used to determine when to inherit the FastStart control information and when to start the 3PPR routine. The following states are defined.

Qs (Start State) is a state in which the gatekeeper is H.245 TCP-connected to the terminal, indicating the start of a control state of the terminal.

Qcr (Capability Set Received State) indicates a state that the gatekeeper has received the terminal Capability Set (CAP).

Qca (Cability Set Ack Received state) indicates a state that the gatekeeper has received the terminal Capability Set Ack (CAPA) message from the terminal.

Qmr (Master Slave Determination Received State) indicates a state that the gatekeeper has received a master slave determination (MSD) message from the terminal.

Qma (Master Slave Determination Ack Received State) indicates a state that a master slave determination ack (MSDA) message is received from the terminal.

Qmd (Master Slave Determined State) indicates a state that a master slave has been determined.

Qor (Open Logical Channel Received State) indicates a state that a logical channel set message (Open Logical Channel (OLC)) has been received.

Qoa indicates that a logical channel set response message (Open Logical Channel Ack (OCLA)) has been received and the 3PPR signaling can be processed.

Qf FACILITY (StartH245) message sent state) indicates that a FACILITY (StartH245) message has been received, a state which has been transitioned from the Qoa state.

For the H.323 call, the control state of the terminal starts from Qs. That is, when the gatekeeper is H.245 TCP connected to the terminal, the control state of the terminal is put in the Qs state. Thereafter, when the gatekeeper receives the terminal Capability Set (CAP) message from the terminal, it transitions the control state of the terminal to Qcr and Qmr in turn and, subsequently, to the Qca, Qma, Qmd, Qor states. Accordingly, the gatekeeper performs the 3PPR signaling in the Qoa state.

Meanwhile, in case of the fast connect call, since the logical channel setting is completed by the SETUP/CONNECT procedure, the control state of the terminal is placed directly in the Qoa state, rather than being transitioned from Qs. Even though the control state of the terminal is put in the Qoa state, if the control channel is not opened, the terminal may not receive the 3PPR service. Accordingly, if the terminal in the Qoa state does not have the control channel, the gatekeeper induces the H.245 TCP connection so as to transition the control state of the terminal to Qs.

When the terminal is transitioned to the Qs state, it can perform the H.245 signaling and also performs up to the H.245 master slave determination signaling. The gatekeeper receives the logical channel information of the fast connect, and transitions it to the Qoa state. That is, as shown in FIG. 4, the gatekeeper transmits the FACILITY (StartH245) message to the terminal and transitions the control state of the terminal from Qoa to Qf. Thereafter, when the TCP connection is set up, the control state of the terminal starts from Qs.

When the gatekeeper receives the terminal Capability Set (CAP) message and the Master Slave Determination MSD) message from the terminal, it shifts the control state of the terminal to the Qmr state. And then, the gatekeeper inherits the logical channel information of the fast connect to transition the control state of the terminal into the Qoa state, so that the 3PPR can be processed.

The state of the logical channel (the control state of the terminal), which has been transitioned to the Qoa state, is expressed as 'ESTABLISHED' in the H.245 logical channel signaling entity (LCSE), which is managed by the gatekeeper. That is, the SETUP message that the origination terminal transmits may contain several FastStart parameter pairs and each pair indicates an Incoming/Outgoing OLC signal. Thus, the gatekeeper generates the LCSE, identified by a logical channel number (LCN), for each FastStart parameter existing in the SETUP message and manages the state of the LCSE as 'AWAITING_ESTABLISHED'. The reason for this is that which one of the FastStart can be admitted by the destination terminal.

Thereafter, the gatekeeper creates "ESTABLISHED" only for the LCSE corresponding to a FastStart received from the destination terminal. The 3PPR signaling performing a handoff is performed only for the channel of which the state of the LCSE is ESTABLISHED.

Figure 5:
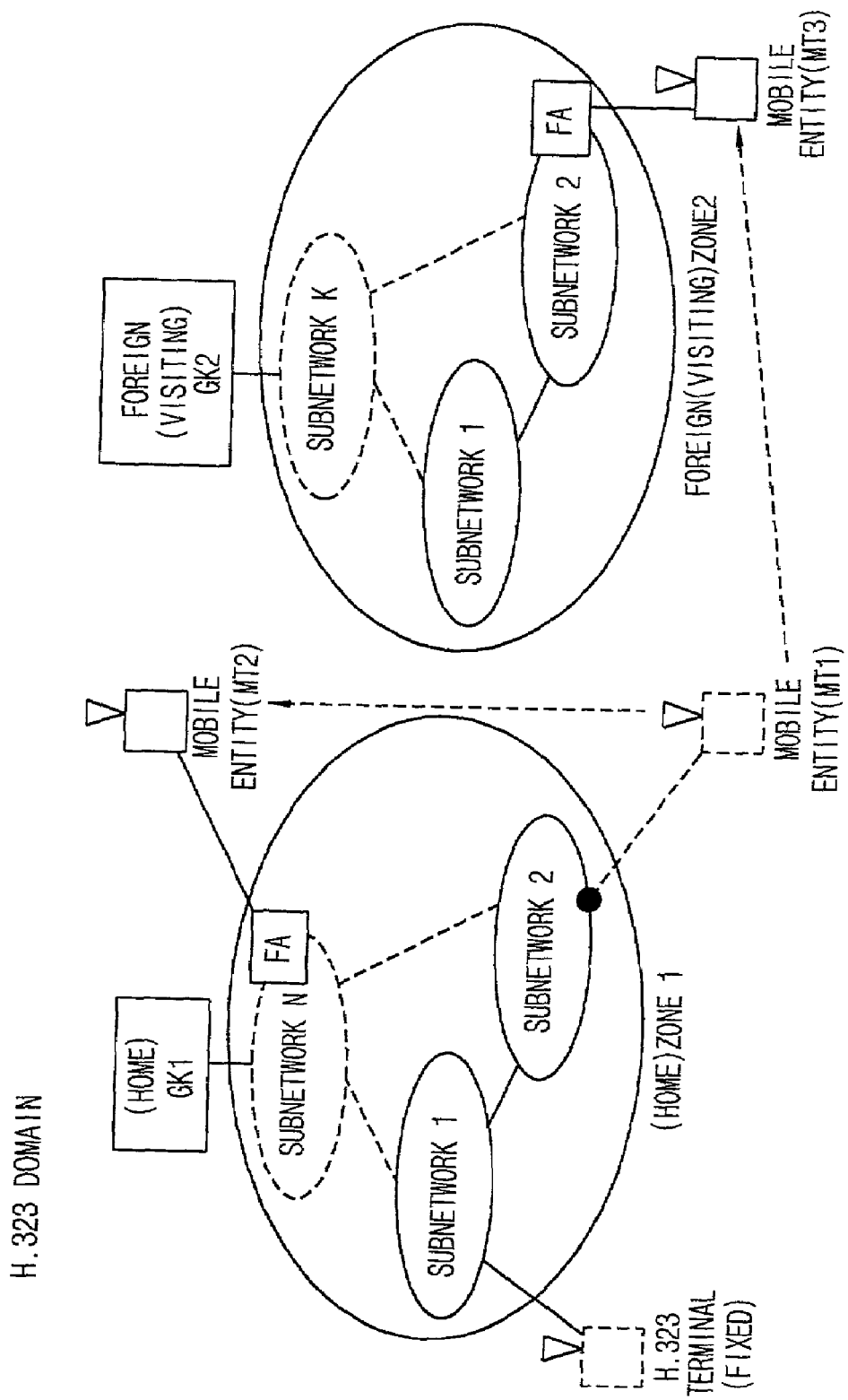
FIG. 5 illustrates the construction of a H.323 IP telephony network in accordance with a preferred embodiment of the present invention.

FIG. 5 is a view illustrating the construction of the H.323 IP telephony network adopting the preferred embodiment. The H.323 ZONE includes more than two subnets and a domain includes more than two zones. Each subnet includes an agent (an Internet router) that is designated as a home agent (HA) or a foreign agent (FA). The agent allocates a care of address (COA) to the H.323 terminal, maps an IP address of the H.323 terminal and the allocated COA, and performs routing. The HA is an Internet router positioned in a subnet where the terminal remains currently and the FA is an Internet router positioned in a subnet into which the terminal has been moved.

The gatekeeper registers and manages information of the H.323 terminal and performs a signaling for a handoff. The mobile terminal may move to another subnet in the same zone and is also movable to a subnet of another zone.

The mobile terminal MT, as the H.323 terminal, may directly communicate with FT without passing through the H.323 gateway (GW), or may also communicate with FT through the H.323 gateway, with a non-H.323 terminal.

If the MT is the H.323 terminal, when the MT is moved to become MT2 or MT3, it is regarded that the capability set of the MT has not been changed and only an IP has been changed. On the other hand, if the MT is connected through the H.323 gateway, when the MT is moved to MT2 or MT3, it is regarded that the capability set of the MT has been changed as well as the IP of the terminal. In both cases, a handoff is performed by changing the control channel information of FT. That is, the RTP packet, which is directed to MT1, is controlled to be transmitted to MT2 or MT3.

When MT1 is moved to become MT2 or MT3, in order to support its handoff, FT transmits the OLC message again to MT2 or MT3 and receives an OLCACK message from MT2 or MT3. In this respect, H.323 provides a H.245 ReplacementFor signaling, for FT to transmit the OLC message again. With this procedure, the handoff process for changing only the IP and the OLC/OLCACK process are merely performed to support the handoff. However, H.245 ReplacementFor signaling is not among the signalings that the H.323 terminal basically processes.

FT performs the 3PPR signaling from the Capability set exchange signaling up to the OLC signaling, after closing its own outgoing channel. The 3PPR signaling is one of the signalings to be processed by the H.323 terminal. Therefore, in the preferred embodiment, the handoff is supported using the 3PPR signaling in every case.

A method for providing a handoff using the 3PPR signaling, under the initiative of the gatekeeper, will now be described.

FIG. 6A is a flow chart of an intra-zone handoff method using the 3PPR signaling for a general H.323 call, in accordance with the preferred embodiment of the present invention. MT1 performs the general H.323 signaling with FT. That is, an AR1/ACF signaling is performed between MT1 and FT (not shown in FIG. 6A), a SETUP/CONNECT signaling is performed (steps S121~S124), a H.245 capability set exchange signaling is performed (step S125), a H.245 master slave determination signaling is performed (step S126), and a logical channel setup signaling is performed so that a general peer-to-peer call is established (step S127).

Thereafter, when it is detected that MT2 has been moved to a different subnet of the same zone, that is, when it is detected that MT1 has been moved to a different subnet and becomes MT2, MT2 is assigned a care of address (COA: a new IP) by the foreign agent (FA) of the corresponding subnet and is requested to be registered for the gatekeeper (step S128). Upon receipt of a request of registration, the gatekeeper performs a handoff routine using the 3PPR signaling, since the terminal changes its IP during the call (step S129). The gatekeeper transmits an empty capability set message to FT so that FT stops transmitting the RTP data (step S130). Then, FT transmits a CLC, indicating LCN=L3, to the gatekeeper to inform it that it will stop transmitting the RTP data (steps S131, S132).

The gatekeeper sets up the Q.931 channel with MT2 and performs a signaling (step S133). When the gatekeeper receives a CONNECT message from MT2, it re-starts FT (step S134) and ends the session with MT1 (step S135). Thereafter, the gatekeeper performs the capability set exchange signaling (step S136), a master slave determination signaling (step S137), and a logical channel setup signaling (step S138) with MT2 and FT, to set up a connection, and reroutes the RPT data received from FT to MT2, so as to support the handoff when MT1 becomes MT2 after being moved.

FIG. 6B is a flow chart of an intra-zone handoff method using the 3PPR signaling for a fast connect call. MT1 performs a fast connect signaling to FT (steps S141~S144). Thus, only with the SETUP/CONNECT signaling, a call is established between MT1 and FT for a communication.

Then, the gatekeeper performs up to master slave determination signaling together with MT1 and FT to induce a control channel with the terminals MT1 and FT (step S145). The control channel induction procedure is performed in a communication state between MT1 and FT according to the steps S107~S108, as shown in FIG. 3.

FT sets the gatekeeper and its own outgoing channel as LCN=L3, through which FT transmits the RTP packet to MT1.

MT2 is assigned a COA by the FA of the subnet to which MT2 has been moved and requested to be registered for the gatekeeper (step S146). Upon receipt of a request of registration, the gatekeeper performs a handoff routine, since the terminal changes its IP during the call (step S 147). The gatekeeper transmits a blank capability set message to FT so that FT stops transmitting the RTP data (step S148). Then, FT transmits a CLC, indicating LCN=L3, to the gatekeeper to inform it that it will stop transmitting the RTP data (steps S149, S150).

The gatekeeper establishes the Q.931 channel with MT2 and performs a signaling (step S151). When the gatekeeper receives a CONNECT message from the MT2, it re-starts FT (step S152). That is, after the gatekeeper receives the capability set message from MT2, it transmits the received message to FT.

Then, FT is transitioned from the pause state to a start state and the gatekeeper starts the H.245 signaling with MT2 and FT (steps S153~S155). Then, the state of the H.245 control channel for FT is transitioned to Qoa, which has received the OLCACK message, so that the state of the channel-related LCSE becomes 'ESTABLISHED'. Thus, FT transmits the RTP packet to the changed MT2 address using its own control information.

Figure 7:
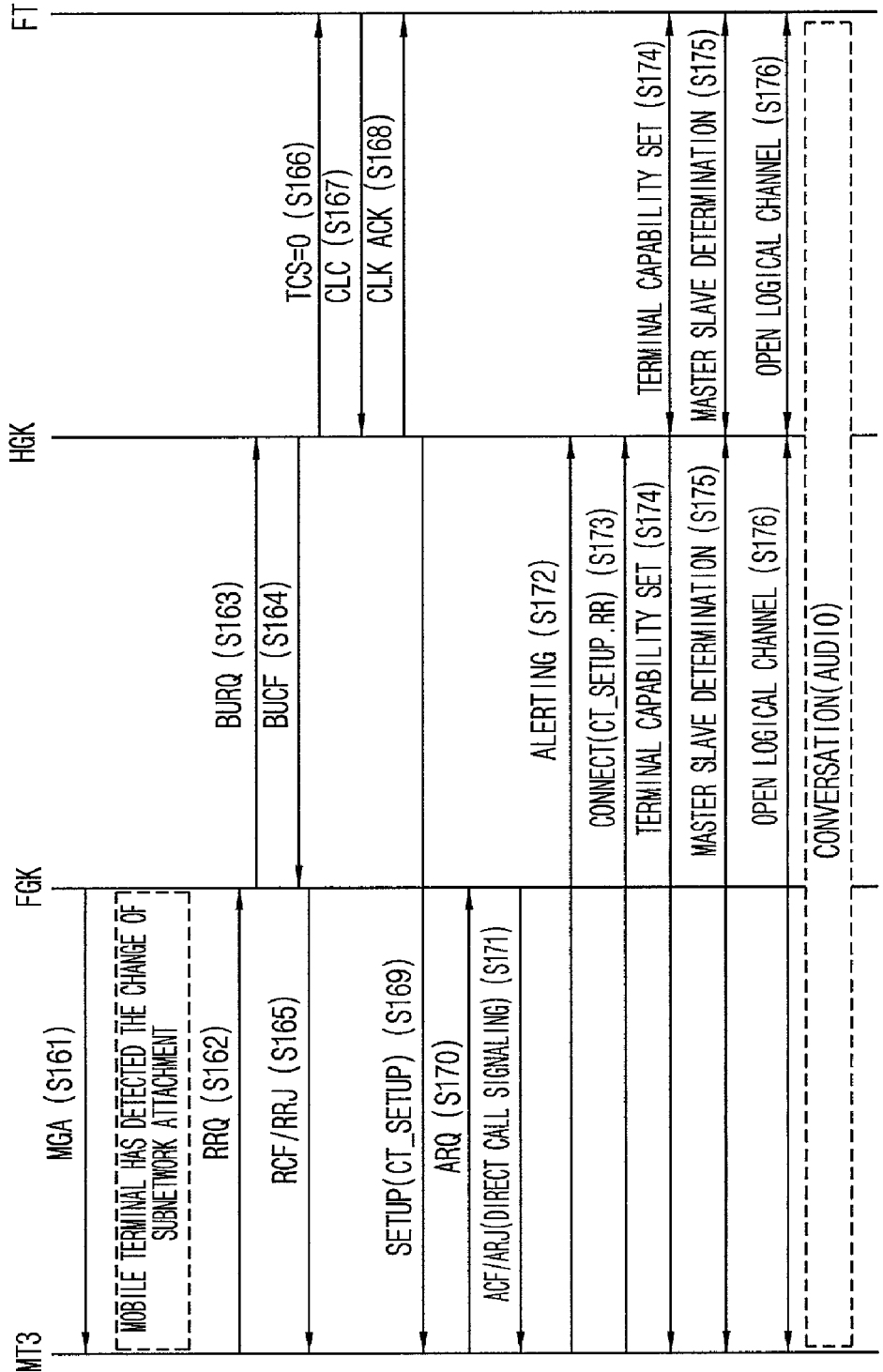
FIG. 7 illustrates a flow chart of an inter-zone handoff method using the 3PPR signaling in accordance with a preferred embodiment of the present invention.

FIG. 7 is a flow chart of an inter-zone handoff method using the 3PPR signaling in accordance with a preferred embodiment of the present invention. Establishing a peer-to-peer call between MT1 and FT follows the procedures shown in FIGS. 6A and 6B, which, thus, is not shown in FIG. 7. As shown in FIG. 7, the inter-zone roaming, where MT1 is moved to an MT3, provides a handoff using a signaling which provides a call transfer through two zones.

With reference to FIG. 5, MT3 assigned a COA by an FA of zone 2 requests a registration from gatekeeper 2 Foreign GK: FGK) (steps S161,S162). Upon receipt of the request for registration, gatekeeper 2 transmits a BuRQ (Binding Update Request) message to home gatekeeper 1 (Home GK: HGK), to inform it that MT1 has moved to become MT3 (step S163). Gatekeeper 1 transmits a response message (Binding Update Confirm: BuCF) to the BuRQ message, through gatekeeper 2 to MT3, to allow the registration (steps S164, S165).

In addition, when gatekeeper 1 receives the BURQ message, it recognizes it should stop FT, stops FT, and drives the 3PPR signaling. That is, the gatekeeper 1 causes FT to be stopped (steps S166~S168) and transmits a SETUP message to MT3 to set up a Q.931 channel with MT3 (step S169). Upon receipt of the SETUP message, MT3 performs an ARQ/ACF procedure together with gatekeeper 2 (steps S170, S171). However, gatekeeper 2 recognizes that the signaling is for a handoff and selects a direct signaling mode. In other words, though the origination terminal and the destination terminal are respectively registered for different gatekeepers and a signaling model of the origination terminal is a gatekeeper route model, the handoff signaling uses a direct signaling model for the signaling model of the destination terminal, to reduce a signaling delay due to the Q.931/H.245 signaling between the gatekeepers.

Thanks to gatekeeper 2's selection of the direct signaling model, MT3 directly opens the Q.931 channel to gatekeeper 1, without passing gatekeeper 2 (steps S172, S173). Gatekeeper 1, for which the Q.931 channel is opened to MT3, connects FT and MT3 to support the handoff (steps S174~S176).

In order to provide the handoff using the 3PPR signaling according to the present invention, the gatekeeper should implement the 3PPR signaling function.

Figure 8:
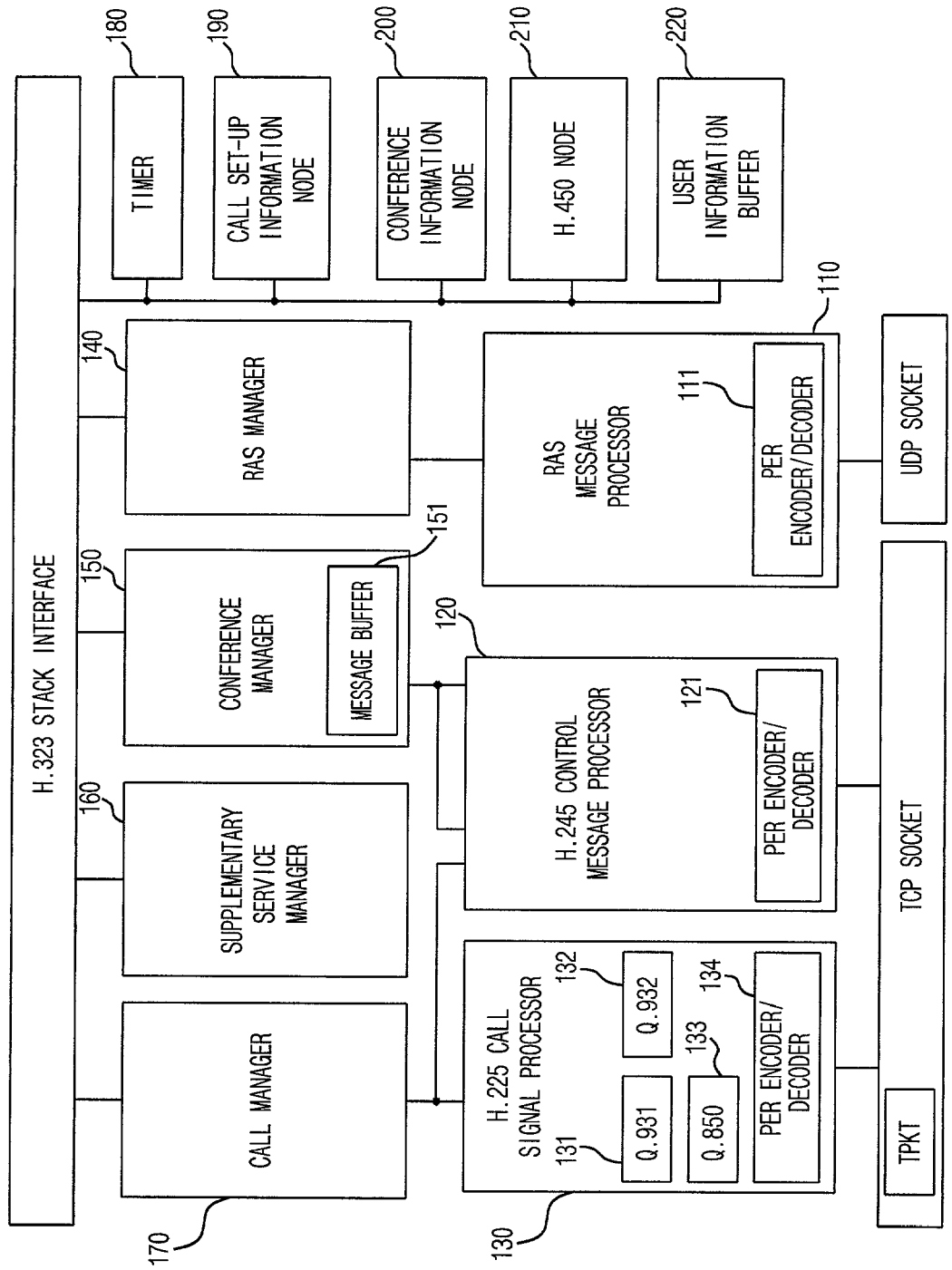
FIG. 8 illustrates a block construction of a gatekeeper having the 3PPR signaling function.

FIG. 8 is a view illustrating a block construction of a gatekeeper having the 3PPR signaling function.

As shown in FIG. 8, the gatekeeper has a registration, admission, and status (RAS) message processor 110, a H.245 control message processor 120, a H.225 call signal processor 130, a RAS manager 140, a conference manager 150, a supplementary service (SS) manager 160, a call manager 170, a timer 180, a call set-up information node 190, a conference information node 200, a supplementary service information node 210, and a user information buffer 220.

The H.225 indicates a call signal protocol for a packet-based multimedia communication.

The RAS manager 140 processes a RAS message for a registration management, an authorization management, and a status management of a H.323 terminal.

The RAS message processor 110 encodes the RAS message, processed by the RAS manager 140, according to a packet encoding rule (PER), decodes the reversely received RAS packet according to the PER, and transmits it to the RAS manager 140.

The call manager 170 processes a Q.931 message (a call signal protocol message).

The conference manager 150 processes a H.245 message for a multimedia communication control.

The H.225 call signal processor 130 carries the call signal message processed by the call manager 170, on a corresponding carrier and encodes it. The H.225 call signal processor 130 also decodes the reversely received call signal packet, according to the PER, and transmits it to the call manager 170.

The H.245 control message processor 120 encodes the message processed by the call manager 170 and the conference manager 150, according to the PER, and transmits it. The H.245 control message processor 120 also decodes the reversely received packet, according to the PER, and transmits it to the call manager 170 and the conference manager 150.

The conference manager 150 includes a message buffer 151 for buffering a message when it opens the H.245 control channel, to support the tunneling function.

The H.225 call signal processor 130 includes a Q.931 carrier 131 for carrying a call signal message received from the call manager 170 on a carrier of a Q.931 format; a Q.932 carrier for carrying the received call signal message on a carrier of a Q.932 format; a Q.850 carrier 133 for carrying the received call signal message on a carrier of a Q.850 format; and a PER encoder/decoder 134 for encoding the message carried on the carrier according to the PER and decoding a call signal packet received by the gatekeeper according to the PER.

The H.245 control message processor 120 includes aPER encoder/decoder 121 for encoding a message received from the call manager 170 and the conference manager 150, according to the PER, and transmitting it to outside of the gatekeeper. Additionally, the H.245 control message processor 120 decodes the packet received by the gatekeeper according to the PER.

The RAS message processor 110 includes a PER encoder/decoder 111 for encoding the RAS message received from the RAS manager 140, according to the PER, and transmitting it to outside of the gatekeeper. The RAS message processor 110 also decodes the RAS packet received by the gatekeeper according to the PER.

The supplementary service manager 160 processes a message for a supplementary service and encodes or decodes the message using the call manager 170 and the conference manager 150.

As the information obtained when each signaling message is processed is stored, the timer 180 is driven and terminated when a pre-set time elapses.

The call set-up information node 190 records the information obtained in processing the Q.931 message and transmits the recorded information to the conference information node 200, when the H.245 TCP connection is made.

The conference information node 200 records the call set-up information transmitted from the call set-up information node 190 and the information obtained when the H.245 signaling is performed.

The supplementary service information node 210 records information obtained when the supplementary service manager 160 processes a H.450 message, for the H.323 supplementary service.

The user information buffer 220 records user information managed by the RAS manager 140.

The managers (140~170) communicate with each other through a function call and a message.

The supplementary service manager 160 calls a conference manager 150, while processing a FACILITY message, which message requests a supplementary service such as a call transfer.

The RAS manager 140 calls the conference manager 150 while processing a COA registration for a handoff of the mobile terminal. The called conference manager 150 performs a 3PPR signaling to stop the mobile terminal and then, when the terminal is stopped, the conference manager 150 calls a call manager 170. The conference manager 150 requests that the called call manager 170 create a call set-up information node 190, using the related conference information node 200, and performs a call transfer or a handoff.

Even though the RAS manager 140 has called the conference manager 150, due to the movement of the terminal, the called conference manager 150 performs a signaling for re-setting a media channel without discriminating whether the calling is caused by the movement of the terminal or the calling is induced to support a supplementary service such as the call transfer. That is, the conference manager 150, implemented with the 3PPR signaling proposed by the present invention, is independent of the network layer such as the mobile IP. Only the RAS manager 140 is related to the mobile IP and manages the user information. That is, the conference manager 150 of the gatekeeper performs the 3PPR signaling and the RAS manager 140 interfaces with a network layer such as a mobile IP. When the RAS manager 140 calls the conference manager 150 for a handoff of the terminal, the conference manager 150 sets a control channel without discriminating whether the calling is for a handoff or for a call transfer supplementary function.

In this respect, the attention is directed to the characteristic of the conference manager 150 of the gatekeeper. A call transfer supplementary function, which is easy for the case of the handoff, is implemented to test the operation of the gatekeeper for performing a handoff signaling in accordance with the present invention. The call transfer service is implemented using the 3PPR signaling proposed by the present invention. Accordingly, the operation of the gatekeeper for performing the call transfer function implemented using the 3PPR signaling will now be described.

Figure 9:
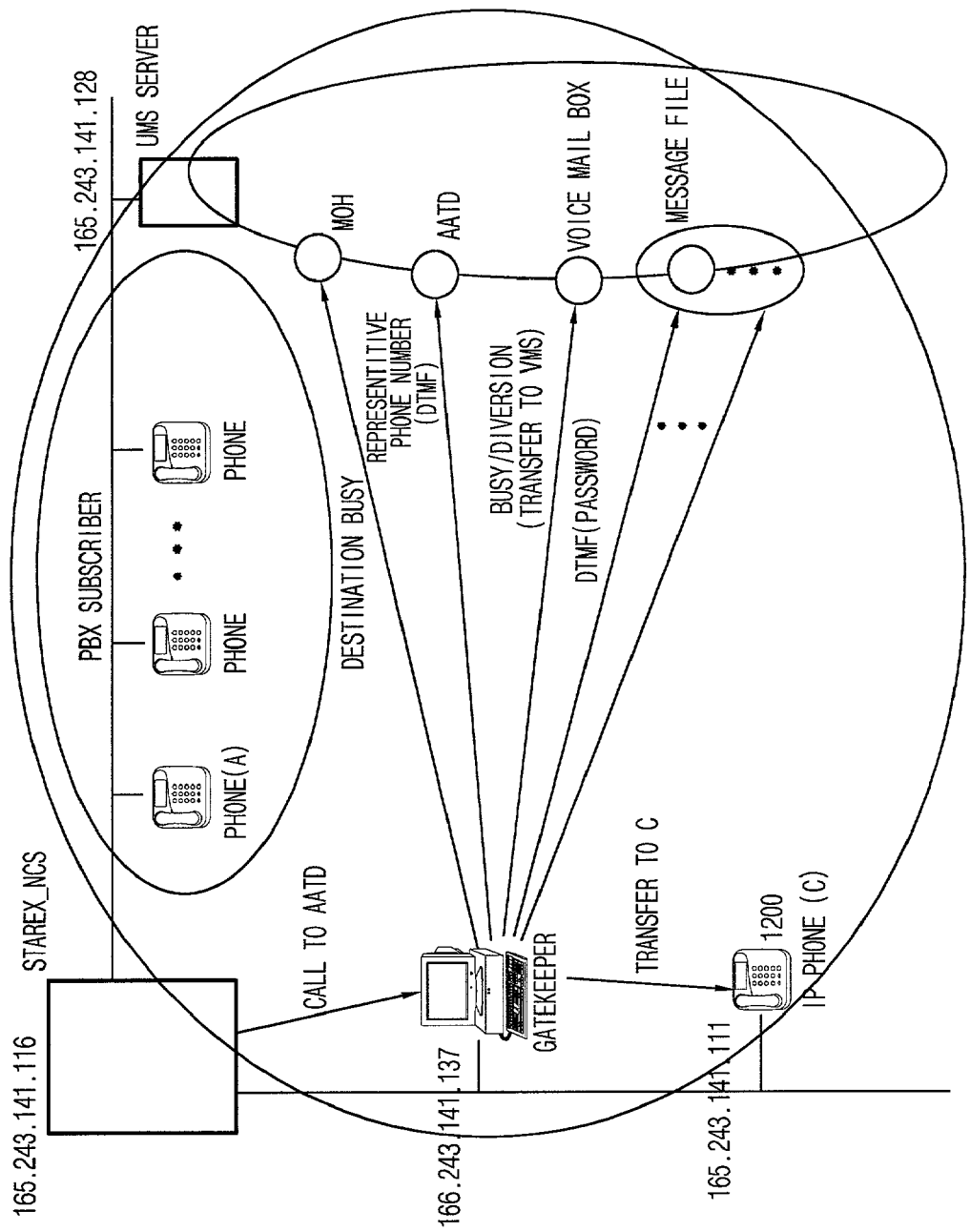
FIG. 9 illustrates the construction of an experimental network providing a call transfer function using the gatekeeper for performing handoff signaling, in accordance with a preferred embodiment of the present invention.

FIG. 9 is a view illustrating the construction of an experimental network providing a call transfer function using the gatekeeper to perform a handoff signaling, in accordance with a preferred embodiment of the present invention. As shown in FIG. 9, a STAREX-NCS (next generation Communication System) is a network product which can mount a router, a switch, a private branch exchange (PBX), and a H.323 gateway. The gatekeeper manages the network provided by the NCS as H.323 ZONE and provides a service integrated between the IP and the Public Switched Telephone Network (PSTN).

A Unified Messaging Service (UMS) server includes a process for generating an auto attendant (AATD) and a Music On Hold (MOH) and is registered in the gatekeeper, together with the gateway and the IP phone. The gateway supports only the fast connect signaling. The UMS server and the IP phone support the fast connect and a tunneling.

In the experiment, when the PBS subscriber 'A' (phone 'A') makes a phone call to the AATD through the H.323 gateway, a dual tone multi-frequency (DTMF) sent by 'A' is transmitted through the gateway to the AATD. Upon receipt of the DTMF, the AATD attempts a call transfer to a corresponding number 'C' and the gatekeeper lets 'A' to listen to the MOH during the call transfer.

When the call transfer is made to 'C', the gatekeeper stops letting 'A' listen to the MOH. If 'C' is busy, the gatekeeper connects 'A' to the AATD. Accordingly, the origination subscriber (PHONE 'A') may wait, while listening to the MOH, until 'C' terminates the telephony or may leave a message in a voice mail box of 'C'. If the origination subscriber selects the MOH, the origination subscriber listens to the MOH. After 'C' finishes the telephony, the origination subscriber and 'C' are connected.

The gateway and the AATD perform a call as a fast connect. When the Q.931 signaling is completed, the gateway and AATD transmit the RTP data to each other and the gatekeeper immediately induces the H.245 TCP connection to perform the H.245 signaling. For this purpose, the terminal (i.e., the origination terminal (PHONE 'A')) sets a processing precedence for a signaling packet to the RTP packet and opens the H.245 control channel during the telephony, thereby providing a prompt signaling.

Figure 10:
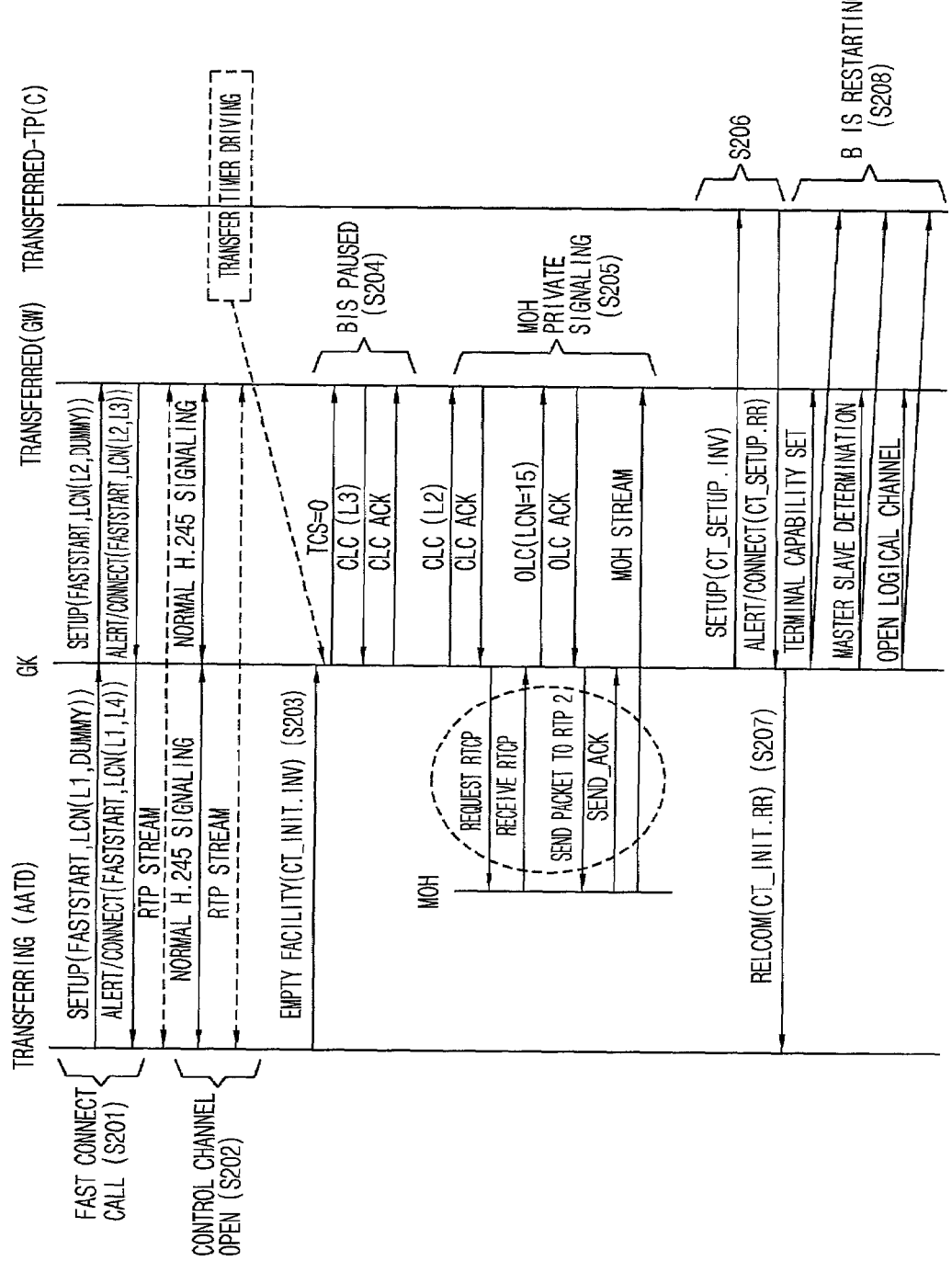
FIG. 10 illustrates a flow chart of a method for performing a call transfer function of a gatekeeper in the experimental network of FIG. 9, in accordance with a preferred embodiment of the present invention.

FIG. 10 is a flow chart of a method for performing a call transfer function of a gatekeeper in the experimental network of FIG. 9, in accordance with the preferred embodiment of the present invention. The AATD and the gateway perform a fast connect signal to establish a call (step S201). Then, the gatekeeper performs the H.245 signaling and opens the control channel (step S202). After the control channel is opened, the AATD transmits a CT_Init H.450.2 message to the gatekeeper and requests a call transfer (step S203).

Information such as an invoke ID of the CT_Init message, which has been received and analyzed by the gatekeeper, is stored in the H.450 node 210 managed by the supplementary service manager 160. A timer 180 is generated for the generated H.450 node 210. If the corresponding timer 180 is completed, the corresponding H.450 node is deleted and the call transfer is failed.

The supplementary service manager 160 analyzes an Empty Facility set message and calls the conference manager 150. The called conference manager 150 transmits the Empty Facility set message to the gateway to pause the gateway. Then, the gateway closes an outgoing channel and listens to the MOH (step S204).

When the gateway listens to the MOH, the conference manager 150 of the gatekeeper calls the call manager 150 and creates a call set-up information node 190, using a related conference node. Then, it sets up the Q.931 channel with 'C' and transmits a SETUP message to 'C', to proceed a signaling (step S206).

The Q.931 connection is established and when a CONNECT message comes from 'C', the Capability set message of 'C' is transmitted to the gateway to reinitiate the gateway. Then, the gateway is changed to the Qoa state and a call is established between the gateway and 'C' (step S208).

When the CONNECT message is received from 'C', the gatekeeper has the Capability set of the gateway. Even though the gateway does not transmit the Capability set message, since the gatekeeper transmits the Capability set message to 'C', 'C' can perform the H.245 signaling.

Meanwhile, in step S206, when the gatekeeper transmits SETUP to 'C', it does not contain FastStart. The reason for this is that even if the gatekeeper transmits the FastStart to 'C' to make a fast connect call, in order to reinitiate 'B', it should restart from the terminal Capability set message exchange and, thus, 'C' can communicate with 'B' after 'B' finishes the H.245 signaling.

The operation (step S205) for letting the terminal listen to the MOH during the call transfer will now be described.

The gatekeeper adjusts an MOH process of the UMS with aprivate message, changes incoming channel information of the gateway using a Close Logical Channel/Open Logical Channel (CLC/OLC) signaling, and lets the terminal listen to the MOH.

When the process for generating the MOH receives a message requesting to transmit data to a specific mode and a specific address from the gatekeeper, it transmits the RTP data to the corresponding CODEC.

The MOH control message includes an inquiry of the Real time Transport Control Protocol (RTCP) to be used for the RTP session. Additionally, the MOH control message includes a COMMAND message and a RESPONSE message for transmitting data to the corresponding address and stopping the transmission of the data.

The gatekeeper puts a session ID and LCN value related to the gateway of the current call in the CLC message, to induce the gateway to close its own incoming channel. And then, the gatekeeper transmits the RTCP address, obtained through the MOH signaling, to the OLC message and changes the incoming channel information of the gateway so that the terminal can listen to the MOH.

Even though the call transfer signaling is failed, the gatekeeper maintains a related call. For example, the control channel information of the gateway may not be properly changed or 'C' and the TCP connection is not made. In this case, if closing of the outgoing channel of the gateway is failed, the gatekeeper calls the supplementary service manager and transmits a CT_init.Return Reject message to the AATD to inform it that the call transfer has been failed (step S207).

And after the gateway is stopped, when the gatekeeper attempts a connection to 'C', if it fails to TCP connect to 'C' or 'C' does not respond (No response), the gatekeeper attempts a recall to the AATD. That is, the gatekeeper transmits a RELCOM to the AATD, closes the previous channel to the AATD, newly sets up a Q.931 channel to create a call that the gateway becomes a caller and the AATD becomes a callee, and re-initiates the gateway so that the gateway can be connected again to the AATD.

A handoff method using a cellular IP in an IP telephony system in accordance with another embodiment of the present invention will now be described.

Figure 11:
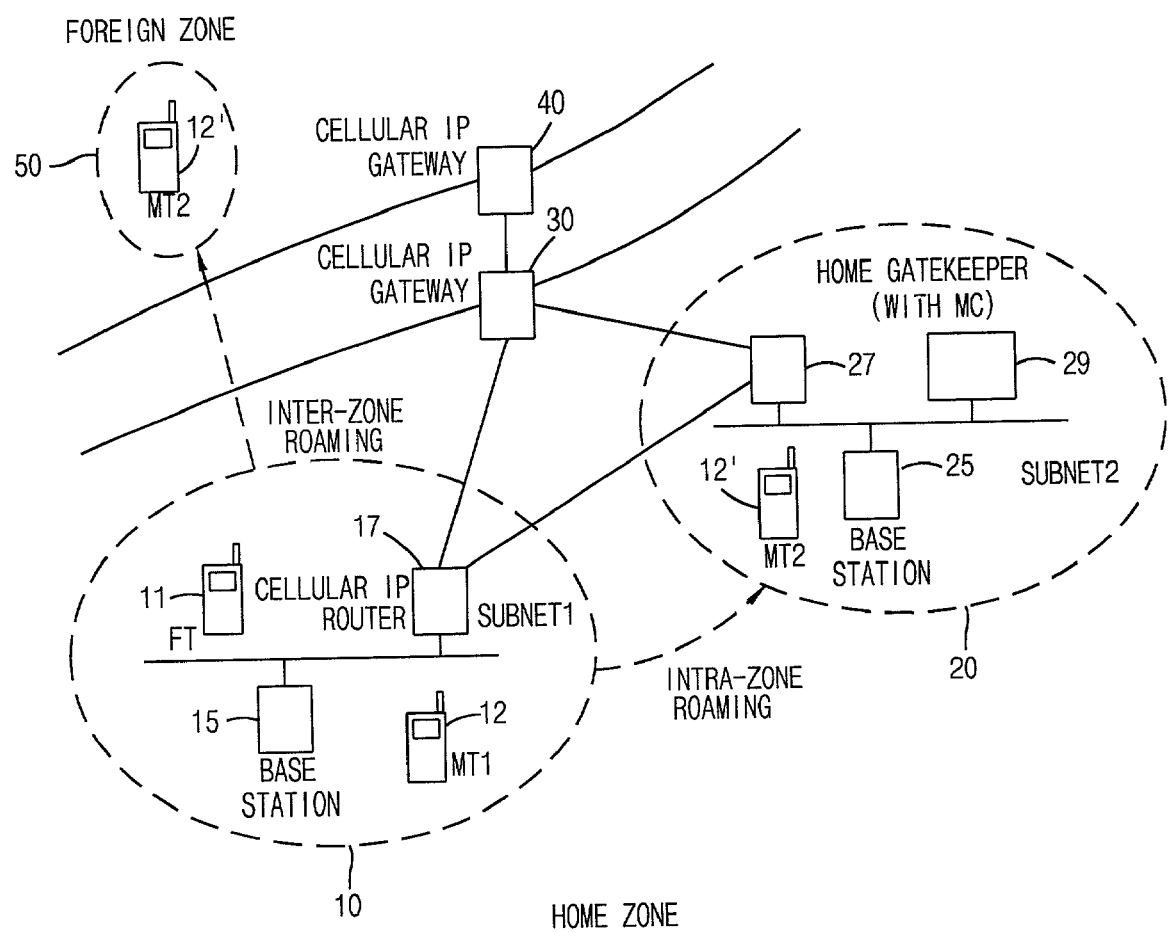
FIG. 11 illustrates the construction of a H.323 network adapting a cellular Internet protocol (IP) to an OSI network layer in accordance with a preferred embodiment of the present invention.
Figure 12:
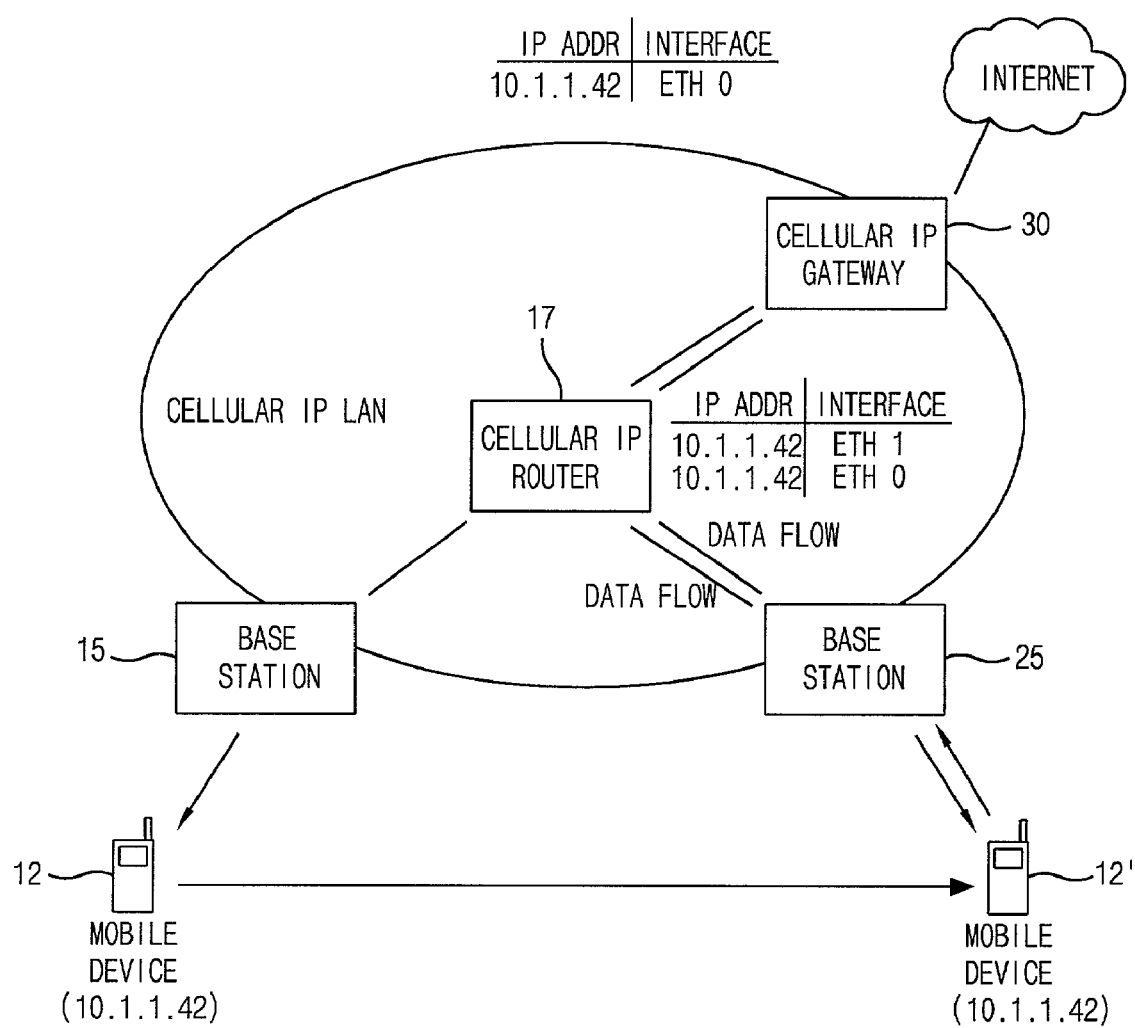
FIG. 12 illustrates the construction of the cellular IP LAN in accordance with a preferred embodiment of the present invention.

Compared to FIG. 5, which shows the construction of the H.323 network in the aspect of the OSI application layer, FIG. 11 shows the construction of a H.323 network in which a cellular internet protocol is adapted to an OSI network layer. FIG. 12 illustrates the construction of a cellular IP LAN in accordance with another embodiment of the present invention.

As shown in FIG. 11, in a H.323 network constructed with the cellular IP network, the zone managed by a gatekeeper 29 includes subnets 10 and 20, which are connected by several cellular IP routers 17 and 27. Cellular IP gateways 30 and 40 are used for connection between zones.

A terminal 11 of the other party, with which a mobile terminal (MT1) 12 is performing a telephone communication, may be a fixed H.323 IP host (Fixed Terminal (FT)) or a mobile H.323 IP host.

The cellular IP local area network (LAN), as illustrated in FIG. 12, includes a cellular IP gateway 30, cellular IP routers 17 and 27, base stations (Bss) 15 and 25, and mobile terminals 12 and 12'.

The cellular IP gateway 30 connects the cellular IP network to a common IP network such as the Internet. The cellular IP routers 17 and 27 of the cellular IP network have an interface for the base stations 15 and 25 connected to them and an interface connected to the cellular IP gateway 30.

The base stations 15 and 25 have a wireless network interface and a wired network interface. The base stations 15 and 25 periodically transmit a beacon signal. At this time, the mobile terminal 12 searches the nearest base station and uses the beacon signal from the searched base station in a handoff.

The intra-zone roaming method in the H.323 network constructed with the cellular IP network will now be described.

Packets that the mobile terminal 12 transmits are always routed by the base stations 15 and 25, forwarded to the cellular IP gateway 30, and then transmitted to a destination. Even if the destination is in the same cellular IP network, the packets are first forwarded to the cellular IP gateway 30 and then transmitted to the destination.

The routers 17 and the base stations 15 and 25, existing in the cellular IP network, have a cache and store the IP of the mobile terminal 12 and an interface causes the packets to reach the mobile terminal 12 by pair. When every packet comes in, the information is updated.

Mapping information of the cache is deleted when a predetermined time elapses. Accordingly, for a terminal that has no data to be transmitted, a control packet is preferably periodically transmitted to refresh the cache information of the base station, the router, and the gateway.

When the mobile terminal 12 is moved from a radio range of the base station 15, in which a connection is currently set up, to a radio range of a different base station 25, that is, in the case of an intra-zone roaming that the mobile terminal 12 is moved from the current subnet 1 to a subnet 2, packets transmitted by the terminal 12' are transmitted through the new base station 25 to the cellular IP gateway 30. The cache of the cellular IP routers 30 and the base stations 25 existing at the route to the cellular IP gateway 30 are updated to support the handoff.

Namely, the content of the cache causes the packets transmitted to the IP of the terminal 12 to be transmitted to the area where the terminal 12 is currently located.

In this manner, even though the terminal is moved to a different IP subnet (in case of the intra-zone roaming), the cellular IP LAN can receive the packets coming to the terminal itself without being assigned a new IP, so that the handoff can be quickly provided to the terminal.

In addition, since the cellular IP performs the intra-zone handoff, the H.323 does not need to perform an additional signaling. Thus, even when the IP is changed during signaling, the signaling messages can be transmitted to the terminal to support the handoff.

For a H.323 call, a global roaming to outside one cellular IP LAN may occur. Even in this case, its handoff can be processed according to the above-described inter-zone handoff method, descriptions of which are omitted.

As so far described, the gatekeeper supporting a handoff and handoff method in an IP telephone communication system has many advantages.

For example, first, the gatekeeper is implemented to be able to perform the 3PPR signaling and initiates to support the handoff using the 3PPR signaling, so that the terminal does not need to have the H.450.2 stack function. Thus, the complexity of the H.323 terminal can be reduced and a handoff signaling can be quickly performed.

Second, in case of a fast connect call, the H.245 control channel is induced and the 3PPR signaling, which is made through the H.245 control channel, is performed for every call including the fast connect call, so that the handoff using the 3PPR signaling can be provided to every call.

Third, the H.245 control channel for the fast connect call is set in accordance with the tunneling during a telephony, so that the fast connection and the merit of the fast connect can be maintained as it is. Thus, the fast handoff signaling can be provided.

Last, when the inter-zone handoff is performed in the H.323 network where the OSI IP layer is implemented with the cellular IP, since the mobile terminal can be provided with a handoff even without obtaining a new IP, an additional H.323 signaling is not necessary and thus a handoff procedure is simplified.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A gatekeeper in an Internet Protocol (IP) telephony system, comprising:
   a conference managing unit configured to process a multimedia communication control message, perform third-party pause and rerouting (3PPR) signaling, and perform a handoff and call transfer signaling for a mobile terminal;
   a registration, admission and status (RAS) managing unit configured to process a RAS message, interface with a network layer, and communicate with the conference managing unit while processing a care of address (COA) registration for the handoff of the mobile terminal;
   a RAS message processor configured to encode and decode the RAS message;
   a call managing unit configured to processes a call signal message;
   a H.225 call signal processor configured to carry the call signal message on a corresponding carrier and encode and decode the call signal message;
   a H.245 control message processor configured to encode and decode messages of the call managing unit and conference managing unit in accordance with the PER;
   a supplementary service managing unit configured to call the conference managing unit while processing a message for a supplementary service;
   a call set-up information node configured to store information obtained when the call signal message is processed;
   a conference information node configured to store control information obtained when the multimedia communication control message is processed;
   a supplementary service information node configured to store information obtained when the message for the supplementary service is processed; and
   a user information buffer configured to store user information managed by the RAS managing unit.

2. The gatekeeper of claim 1, wherein the conference managing unit further comprises a message buffer configured to buffer a plurality of messages while opening a multimedia communication control channel to support a tunneling function.

3. The gatekeeper of claim 2, wherein conference managing unit is configured to pause a transmission of signals to the mobile terminal during the handoff and transfer, and store the plurality of messages in the buffer during the pause.

4. The gatekeeper of claim 3, wherein conference managing unit is configured to re-initiate the transmission of signals to the terminal upon completion of the handoff and transfer, and transmit the plurality of messages stored in the buffer upon re-initiation.

5. The gatekeeper of claim 1, wherein the H.225 call signal processor further comprises:

a Q.931 carrier configured to carry the call signal message received from the call managing unit on the carrier of a Q.931 format;

a Q.932 carrier configured to carry the received call signal message on the carrier of a Q.932 format;

a Q.850 carrier configured to carry the received call signal message on the carrier of a Q.850 format; and a PER encoder/decoder configured to encode the call signal message carried on the corresponding carrier according to the PER and decode a call signal packet received by the gatekeeper in accordance with the PER.

6. The gatekeeper of claim 1, wherein the H.245 control message processor further comprises a PER encoder/decoder configured to encode a message received from the call managing unit and the conference managing unit in accordance with the PER and output the encoded message from the gatekeeper, and wherein the PER encoder/decoder decodes a packet received by the gatekeeper in accordance with the PER.

7. The gatekeeper of claim 1, wherein the RAS message processor further comprises a PER encoder/decoder configured to encode the RAS message received from the RAS managing unit in accordance with the PER, and output the encoded message from the gatekeeper, and to decode a RAS packet received by the gatekeeper in accordance with the PER.

8. The gatekeeper of claim 1, wherein the conference managing unit resets a media channel when called, without discriminating whether the call is caused by movement of the mobile terminal or caused to support the supplementary service.

9. The gatekeeper of claim 1, wherein when called, the conference managing unit pauses signals to the mobile terminal by performing the 3PPR signaling, calls the call managing unit when the mobile terminal is paused, and requests the call managing unit to update the call set-up information node in accordance with related information from the conference information node, to perform one of a call transfer and the handoff.

10. The gatekeeper of claim 1, wherein the gatekeeper provides an intra-zone handoff method using the 3PPR signaling in an Internet Protocol (IP) telephony system, the intra-zone handoff method, comprising:

determining whether an established call between an origination terminal and a destination terminal is a general call or a fast connect call;

opening a H.245 control channel with the origination terminal and the destination terminal if it is determined that the established call is a fast connect call;

suspending the destination terminal so as to perform a handoff when the origination terminal moves to a different subnet of the same zone and requests a registration using a newly allocated care of address (COA);

performing Q.931 signaling with the moved origination terminal and transmitting a terminal capability set message received from the moved origination terminal to the suspended destination terminal to re-initiate the destination terminal; and performing master slave determination signaling and logic channel establishment signaling between the moved origination terminal and the destination terminal and re-routing a data packet received from the destination terminal to the moved origination terminal.

11. The gatekeeper of claim 10, wherein a gateway determines whether a general call is established.

12. The gatekeeper of claim 10, wherein the data packet is a real-time transport protocol (RTP) packet.

13. The gatekeeper of claim 10, wherein opening the H.245 control cannel comprises:

setting up a H.245 TCP connection between the origination terminal and the destination terminal;

performing a H.245 capability set exchange signaling; and performing an initial H.245 master slave determination signaling.

14. The gatekeeper of claim 10, wherein the gatekeeper performs a message buffering function in opening the H.245 control channel to support a tunneling function.

15. The gatekeeper of claim 10, wherein if it is determined that the call is the fast connect call, a control state of a H.245 signaling is changed to a CapabilitySetAck Received (Qoa) state without going through a Start (Qs) State, transitioned from the Qoa state to the Qs state according to a H.245 TCP connection induction, transitioned from the Qs state to a CapabilitySet Received (Qcr) State upon to receipt of a Capability Set message, transitioned from the Qcr state to a MasterSlaveDetermination Received (Qmr) State upon receipt of a master slave determination message, and transitioned to the Qoa state according to receipt of logical channel information of the fast connect so that third-party pause and rerouting (3PPR) signaling can be performed.

16. The gatekeeper of claim 10, wherein rerouting the data packet to the moved origination terminal comprises:

substituting IP fields of every message sent by the moved origination terminal to the gatekeeper with COAs allocated by a foreign agent (FA); and changing a destination address of an IP header of a received message from the COA to an IP address of the moved origination terminal when a signaling message transmitted from the gatekeeper and the data packet transmitted from the destination terminal are received by the FA.

17. The gatekeeper of claim 10, wherein if it is determined that the general call is established between the origination terminal and the destination terminal, the gatekeeper performs a third party initiated pause and rerouting signaling for the intra-zone handoff using the H.245 control channel.

18. The gatekeeper of claim 10, wherein the intra-zone handoff method, comprising:

pausing a destination terminal to perform an intra-zone handoff when the origination terminal that has moved to another subnet of a same zone requests a registration using a newly allocated care of address (COA);

performing Q.931 signaling with the origination terminal and transmitting a terminal capability set message received from the origination terminal to the paused destination terminal to re-initiate the destination terminal; and performing H.245 control signaling between the origination terminal and the destination terminal and re-routing a real-time transmission protocol (RTP) packet from the destination terminal to the origination terminal.

19. The gatekeeper of claim 1, wherein the gatekeeper provides an inter-zone handoff method for a fast connect call using the 3PPR signaling, the inter-zone handoff method comprising:

opening a H.245 control channel between an origination terminal and a destination terminal;

informing a home gatekeeper (HGK) by a foreign gatekeeper (FGK) of inter-zone roaming of the origination terminal when the origination terminal moves into a subnet of a different zone and requests a registration from the FGK, using a newly allocated care of address (COA);

registering the moved origination terminal and instructing a suspension of the destination terminal when the inter-zone roaming of the origination terminal is sensed by the HGK;

performing direct signaling between the moved origination terminal and the FGK when a set-up message is transmitted to the moved origination terminal, and opening a Q.931 channel directly by the moved origination terminal and the HGK without passing through the FGK;

receiving a terminal capability set message from the moved origination terminal and transmitting the received terminal capability set message to the destination terminal to re-initiate the suspended destination terminal;

performing H.245 control signaling with the moved origination terminal and the destination terminal and rerouting a RTP packet received from the destination terminal to the moved origination terminal.

20. The gatekeeper of claim 19, wherein the intra-zone handoff method further comprising determining whether a call is a general call or a fast connect call when the call is established between the origination terminal and the destination terminal.

21. The gatekeeper of claim 19, wherein opening the H.245 control channel comprises:
setting up a H.245 TCP connection between the origination terminal and the destination terminal;
performing a H.245 capability set exchange signaling; and
performing a H.245 master slave determination signaling.

22. The gatekeeper of claim 19, wherein the HGK performs a message buffering function when the H.245 control channel is opened to support a tunneling function.

23. The gatekeeper of claim 19, wherein when the call is established, a control state of a H.245 signaling is changed to a CapabilitySetAck Received (Qoa) state without going through a Start (Qs) State, transitioned from the Qoa state to the Qs state according to a H.245 TCP connection induction, transitioned from the Qs state to a CapabilitySet Received (Qcr) State upon to receipt of a Capability Set message, transitioned from the Qcr state to a MasterSlaveDetermination Received (Qmr) State upon receipt of a master slave determination message, and transitioned to the Qoa state according to receipt of logical channel information of the fast connect so that third-party pause and rerouting (3PPR) signaling can be performed.

24. The gatekeeper of claim 19, wherein the inter-zone handoff method, comprising:
informing a home gatekeeper (HGK) by a foreign gatekeeper (FGK) of inter-zone roaming of an origination terminal when the origination terminal moves into a subnet of a different zone and requests a registration from the FGK, using a newly allocated care of address (COA);

admitting the registration of the moved origination terminal and pausing a destination terminal when the HGK recognizes the inter-zone roaming of the origination terminal;

performing direct signaling between the moved origination terminal and the FGK when a set-up message is transmitted from the HGK to the moved origination terminal;

opening a Q.931 channel directly between the moved origination terminal and the HGK without the FGK;

receiving a terminal capability set message from the moved origination terminal and transmitting the received terminal capability set message to the destination terminal to re-initiate the paused destination terminal; and performing H.245 control signaling between the moved origination terminal and the destination terminal and re-routing a real-time transmission protocol (RTP) packet received from the destination terminal to the moved origination terminal.

25. The gatekeeper of claim 1, wherein the gatekeeper provides an inter-zone handoff method, comprising:
updating routing information of a first routing cache when a packet is received from a mobile terminal that has moved from a first subnet to a second subnet, and transmitting the packet from a cellular IP base station to a cellular IP router;
updating routing information of a second routing cache when the packet is received from the cellular IP base station and routing the received packet from the cellular IP router to a cellular IP gateway; and
updating routing information of a third routing cache when the packet is received from the cellular H7 router and routing the received packet to another party terminal, according to the routing information stored in the third routing cache.

26. The method of claim 25, wherein an IP address of a H.323 terminal and an interface to the H.323 terminal are stored as a pair in the first, second, and third routing caches.

27. The method of claim 25, wherein the respective routing information stored in each routing cache is deleted when a prescribed period of time elapses, and wherein the mobile terminal periodically transmits a control packet so that routing information of each routing cache can be refreshed when the mobile terminal has no other data packets to be transmitted.

* * * * *